United States Patent
He

(10) Patent No.: US 11,844,003 B2
(45) Date of Patent: *Dec. 12, 2023

(54) METHOD FOR CONVERGING SENSED INFORMATION OF MULTIPLE SENSORS AND DEVICE THEREOF

(71) Applicant: SUTENG INNOVATION TECHNOLOGY CO., LTD., Shenzhen (CN)

(72) Inventor: Shiwen He, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,901

(22) Filed: Nov. 16, 2022

(65) Prior Publication Data

US 2023/0084838 A1  Mar. 16, 2023

Related U.S. Application Data

(63) Continuation of application No. 17/742,343, filed on May 11, 2022, now Pat. No. 11,533,590.

(30) Foreign Application Priority Data

May 13, 2021  (CN) .......................... 202110520652.8

(51) Int. Cl.
*H04W 4/38*  (2018.01)
*H04W 4/46*  (2018.01)
(Continued)

(52) U.S. Cl.
CPC ............... *H04W 4/38* (2018.02); *H04L 67/12* (2013.01); *H04W 4/46* (2018.02); *H04W 84/18* (2013.01)

(58) Field of Classification Search
CPC .......... H04L 67/12; H04W 4/02; H04W 4/38; H04W 4/46; H04W 24/02; H04W 84/18
See application file for complete search history.

(56) References Cited

U.S. PATENT DOCUMENTS 9,516,141 B2 * 12/2016 Dubois .................. G16H 40/67
2008/0069008 A1 * 3/2008 Park ...................... H04W 64/00
370/254

(Continued)

FOREIGN PATENT DOCUMENTS

CN    201623860 U    11/2010
CN    202276353 U     6/2012
(Continued)

OTHER PUBLICATIONS

Chen, "A Secure Data Fusion Method Based on Dynamic Segmentation Technique," English Machine Translation of Xing (CN 107318109 A), Clarivate Analytics, pp. 1-4 (Year: 2023).*

(Continued)

*Primary Examiner* — Khaled M Kassim
*Assistant Examiner* — Kai Chang
(74) *Attorney, Agent, or Firm* — BAYES PLLC

(57) ABSTRACT

A layered convergence topology structure for a plurality of sensors is established based on a sensing range and a position relationship of at least one sensor from the sensors. A plurality of pieces of first sensed information, respectively captured through each sensor of the sensors, are divided into at least two first groups based on the layered convergence topology structure. Each piece of first sensed information in respective first group of the at least two first groups is converged to obtain at least two pieces of first converged information. The at least two pieces of first converged information are determined as at least two pieces of second sensed information for convergence to obtain second converged information. When a piece number of the second (Continued)

converged information is one, the second converged information is determined as target converged information.

18 Claims, 24 Drawing Sheets

(51) Int. Cl.
*H04L 67/12* (2022.01)
*H04W 84/08* (2009.01)
*H04W 84/18* (2009.01)

(56) References Cited

U.S. PATENT DOCUMENTS

| | | | | |
|---|---|---|---|---|
| 2015/0341739 | A1* | 11/2015 | Jin | H04L 43/16 |
| | | | | 370/254 |
| 2016/0072893 | A1* | 3/2016 | Suzuki | H04W 4/38 |
| | | | | 709/224 |
| 2019/0140939 | A1* | 5/2019 | Schooler | H04L 67/5651 |
| 2020/0296730 | A1 | 9/2020 | Kwasnick et al. | |

FOREIGN PATENT DOCUMENTS

| | | | | |
|---|---|---|---|---|
| CN | 104410997 | A * | 3/2015 | |
| CN | 105933388 | A | 9/2016 | |
| CN | 107318109 | A * | 11/2017 | H04W 12/02 |
| CN | 104053175 | B * | 1/2019 | |
| CN | 110401564 | A * | 11/2019 | H04L41/12 |

OTHER PUBLICATIONS

First Office Action issued in related Chinese Application No. 202110520652.8, dated Jun. 28, 2021, 10 pages.
Second Office Action issued in related Chinese Application No. 202110520652.8, dated Jul. 19, 2021, 7 pages.
Chaojuan He, " Research and implementation of routing layer data fusion based on TinyOS", China Master's Thesis Full-text Database Information Technology Series, Dec. 15, 2011.

* cited by examiner

METHOD FOR CONVERGING SENSED INFORMATION OF MULTIPLE SENSORS AND DEVICE THEREOF

CROSS-REFERENCE TO RELATED APPLICATIONS

This application is a continuation of U.S. patent application Ser. No. 17/742,343, filed on May 11, 2022, which claims the benefit to Chinese Patent Application No. 202110520652.8, filed on May 13, 2021, the contents of both of which are incorporated herein by reference in their entireties.

TECHNICAL FIELD

This application relates to the field of communication technologies, and in particular, to a method and a device for converging sensed information of multiple sensors, a storage medium, and an electronic device.

BACKGROUND

As sensor functions become increasingly developed and communication technologies get widely applied, a sensor may be used to sense object information in a target region and transmit the object information to a control unit. For example, in application scenarios such as smart transportation and autonomous driving, the sensor obtains sensed information such as a position, a size, and a motion status of traffic participants such as a vehicle and a pedestrian on the road, so that a driving status of the vehicle on the road can be determined and traffic signal control can be coordinated based on the sensed information, thereby improving quality and efficiency of road management.

In an application scenario with a large to-be-sensed region, a sensed region of a single sensor usually cannot satisfy a coverage requirement. Therefore, usually, multiple sensors are disposed in the to-be-sensed region, and in order to ensure that sensed regions of the multiple sensors completely cover the to-be-sensed region, when the multiple sensors are disposed, it is necessary to ensure existence of an overlapped region between the multiple sensors. In order to obtain sensed information of a target in the to-be-sensed region, it is necessary to converge the sensed information of the multiple sensors. When the sensed information is obtained from the multiple sensors, because of a large range of the to-be-sensed region and a large data volume of the sensed information, a problem of excessive need for bandwidth occurs in a process of convergence communication.

SUMMARY

Embodiments of this application provide a method and a device for converging sensed information of multiple sensors, a storage medium, and an electronic device, so that a bandwidth need during convergence communication can be reduced.

Technical solutions are as follows:

According to a first aspect, an embodiment of this application provides a method for converging sensed information of multiple sensors, where the method includes:

establishing a layered convergence topology structure based on a sensing range and a position relationship of at least one sensor;

separately obtaining sensed information sensed by each sensor; and subjecting each piece of sensed information to layered convergence by using the layered convergence topology structure and generating target converged information.

According to a second aspect, an embodiment of this application provides a device for converging sensed information of multiple sensors, where the device includes:

a structure establishment module, configured to establish a layered convergence topology structure based on a sensing range and a position relationship of at least one sensor;

an information obtaining module, configured to separately obtain sensed information sensed by each sensor; and an information generation module, configured to subject each piece of sensed information to layered convergence by using the layered convergence topology structure, and generate target converged information.

According to a third aspect, an embodiment of this application provides a computer storage medium. The computer storage medium stores a plurality of instructions. The instructions are adapted to be loaded by a processor and execute the steps of the forgoing method.

According to a fourth aspect, an embodiment of this application provides an electronic device, including a processor and a memory, where the memory stores a computer program, and the computer program is capable of being loaded by the processor to perform the steps of the forgoing method.

The beneficial effects provided by the technical solutions of some embodiments of the present application include at least:

In one or more embodiments of this application, based on a sensing range and a position relationship of at least one sensor, a layered convergence topology structure is established, the sensed information sensed by each sensor is obtained separately, each piece of sensed information is subjected to layered convergence by using the layered convergence topology structure, and target converged information is generated. Herein, compared with the method of converging the sensed information all at once, when the layered convergence topology structure is used to converge the sensed information, a data volume of the sensed information during convergence communication can be reduced, thereby reducing the bandwidth need during the convergence communication. In addition, based on the sensing range and position relationship of the sensors, the layered convergence topology structure is established, so that a communication distance can be reduced, thereby improving communication efficiency and further reducing the bandwidth need during the convergence communication.

BRIEF DESCRIPTION OF DRAWINGS

To explain embodiments of the present application more clearly, the following briefly introduces the drawings that need to be used in the embodiments. Obviously, the drawings in the following description are only some embodiments of the present application. The person skilled in the art may obtain other drawings based on these drawings without inventive labor.

DETAILED DESCRIPTION

The following clearly and completely describes the technical solutions in the embodiments of this application with reference to the drawings in the embodiments of this application. Obviously, the described embodiments are only some but not all of the embodiments of this application. All other embodiments obtained by a person of ordinary skill in the art based on the embodiments of this application without creative efforts shall fall within the protection scope of this application.

In the descriptions of this application, it should be understood that the terms such as "first" and "second" are merely intended for description, and should not be understood as an indication or implication of relative importance. In the descriptions of this application, it should be understood that "include," "have," or any other variant thereof are intended to cover a non-exclusive inclusion unless otherwise specified and defined explicitly. For example, a process, a method, a system, a product, or a device that includes a series of steps or units is not limited to the listed steps or units, but optionally further includes an unlisted step or unit, or optionally further includes another inherent step or unit of the process, the method, the product, or the device. The person skilled in the art can understand specific meanings of the foregoing terms in the present application under a specific situation. In addition, in the descriptions of this application, "a plurality of" means two or more unless otherwise specified. Herein, "and/or" is an association relationship for describing associated objects and indicates that three relationships may exist. For example, A and/or B may mean the following three cases: only A exists, both A and B exist, and only B exists. The character "/" generally indicates an "or" relationship between the associated objects.

Figure 1:
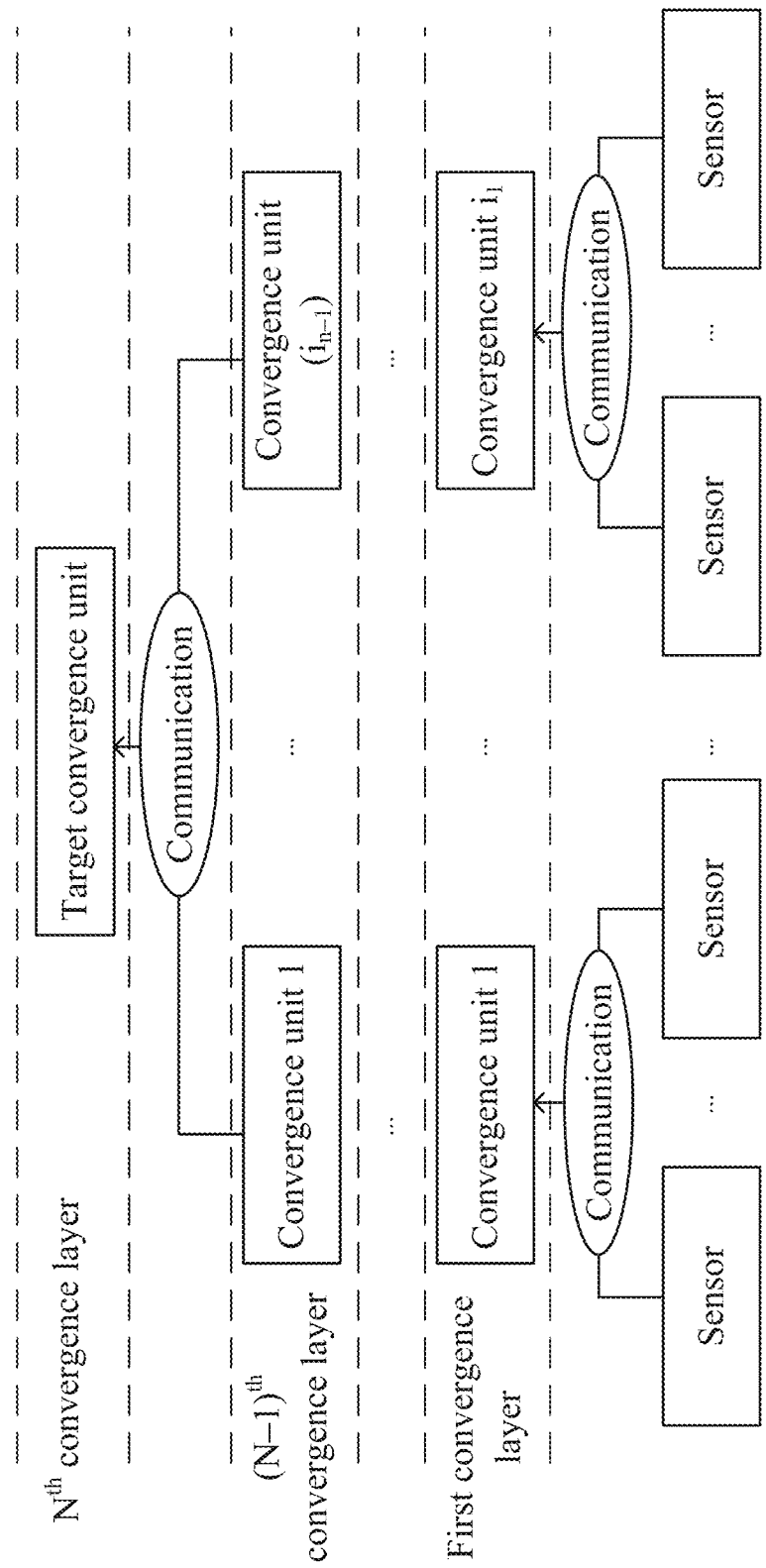
FIG. 1 is a system architecture diagram of a method for converging sensed information of multiple sensors according to an embodiment of this application.

A method for converging sensed information of multiple sensors provided in embodiments of this application can resolve one or more of the foregoing problems. FIG. 1 is a system architecture diagram of a method for converging sensed information of multiple sensors that is applied to an embodiment of this application. As shown in FIG. 1, an electronic device in this embodiment of this application includes multiple sensors and multiple convergence units, the multiple sensors are divided into multiple groups, and the convergence units are divided into multiple convergence layers based on a preset number of convergence layers. Specifically, using N convergence layers as an example, where N can be a natural number greater than 1, such as 2, 5, and 11, the first convergence layer can include $i_1$ convergence units, the second convergence layer can include $i_2$ convergence units, . . . , an (N−1)th convergence layer can include $i_{n-1}$ convergence units, and an Nth convergence layer can include 1 target convergence unit. It can be understood that $i_1$, $i_2$, . . . , $i_{n-1}$, and the like can be natural numbers greater than 1. Herein, the sensors are divided into multiple first groups, each first group corresponds to one convergence unit in the first convergence layer, and the convergence unit has a communication connection with each sensor in the first group that is used for obtaining sensed information corresponding to each sensor in the first group and performing convergence to obtain converged information corresponding to the first group (that is, converged information corresponding to the convergence unit). Further, convergence units in the first convergence layer are divided into multiple second groups, each second group corresponds to one convergence unit in the second convergence layer, and the convergence unit has a communication connection with each convergence unit in the first group that is used for obtaining converged information corresponding to each convergence unit in the first group and performing convergence to obtain converged information corresponding to the second group (that is, converged information corresponding to the convergence unit). It is easily understandable that convergence units in an Mth convergence layer are divided into multiple (M+1)th groups, each (M+1)th group corresponds to one convergence unit in an (M+1)th convergence layer, and the convergence unit has a communication connection with each convergence unit in the Mth group that is used for obtaining converged information corresponding to each convergence unit in the (M+1)th group and performing convergence to obtain converged information corresponding to the (M+1)th group (that is, converged information corresponding to the convergence unit), where M is any natural number between 1 and N−2, that is, the Mth convergence layer is any layer from the first convergence layer to the (N−2)th convergence layer. It should be noted that, in the (N−1)th convergence layer, each convergence unit in the (N−1)th convergence layer has a communication connection with a target convergence unit in the Nth convergence layer, and the target convergence unit can obtain converged information corresponding to each convergence unit in the (N−1)th convergence layer and perform convergence to obtain the target converged information.

Figure 2:
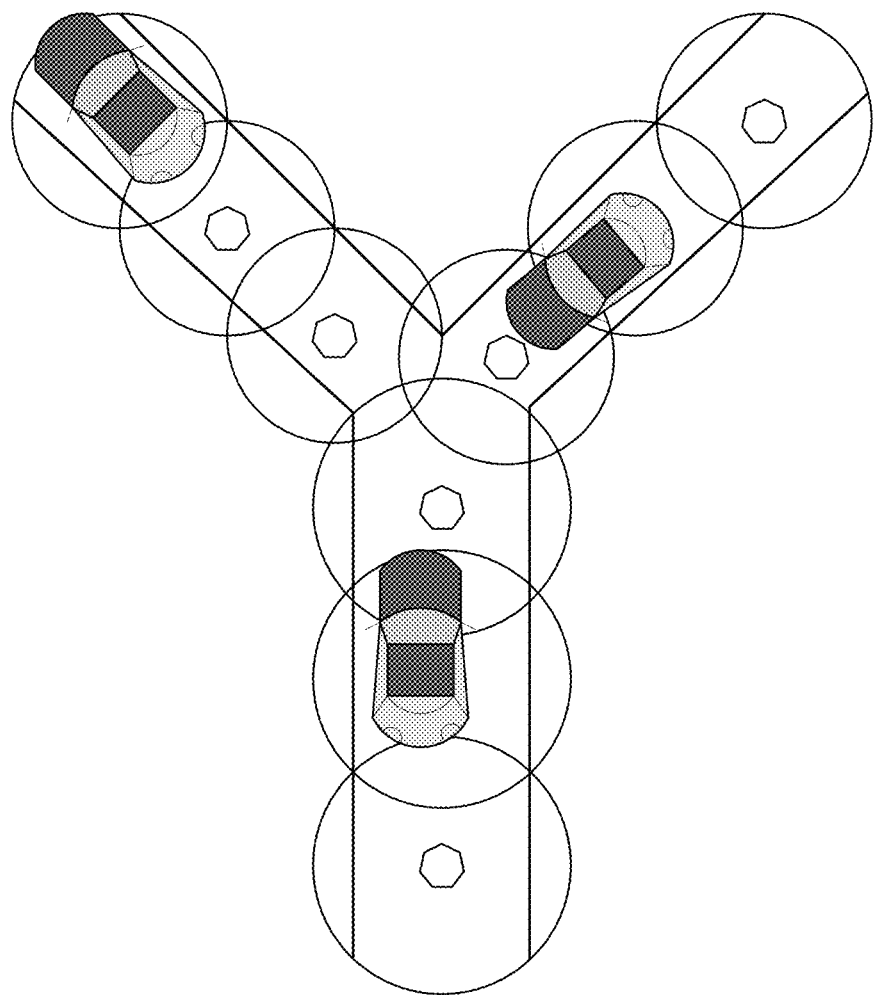
FIG. 2 is a schematic diagram of a scenario of a method for converging sensed information of multiple sensors according to an embodiment of this application.

In some embodiments, FIG. 2 is a schematic diagram of a scenario of a method for converging sensed information of multiple sensors that is applied to an embodiment of this application. As shown in FIG. 2, when multiple sensors are applied to smart transportation, in view of local traffic conditions and environmental conditions, the multiple sensors are disposed in a to-be-sensed region, the multiple sensors are disposed at an intersection, and sensed regions of the sensors are overlapped and cover an intersection of three roads. Herein, the sensor includes but is not limited to a camera, a radar, and an infrared detector. The sensors can be grouped based on a sensing range and a position relationship of the sensors. Sensors in an adjacency relationship are divided into a same group, and sensors in a disjoint relationship are divided into different groups. The sensed information of the sensor is obtained based on the grouping, to avoid concentrated transmission of all sensed information to the convergence unit, thereby reducing a bandwidth need during convergence communication. Herein, a communication manner of the sensors and convergence units may be wired communication or wireless communication. Herein, the wireless communication manner may be transmitting data by using a 4th generation mobile communication system (4G), a new radio (NR) system of a 5th generation wireless communication technology (5G) or a future communication system, or other various wireless communication systems, such as a Narrowband Internet of Things (NB-IoT) system, the global system for mobile communication (GSM), an Enhanced Data rates for GSM Evolution (EDGE) system, a Wideband Code Division Multiple Access (WCDMA) system, a Code Division Multiple Access 2000 (CDMA2000) system, a Time Division-Synchronous Code Division Multiple Access (TD-SCDMA) system, a general packet radio service (GPRS), a Long Term Evolution (LTE) system, an LTE Frequency Division Duplex (FDD) system, LTE Time Division Duplex (TDD), or the Universal Mobile Telecommunications System (UMTS).

This application is described in detail below with reference to specific embodiments.

Figure 3:
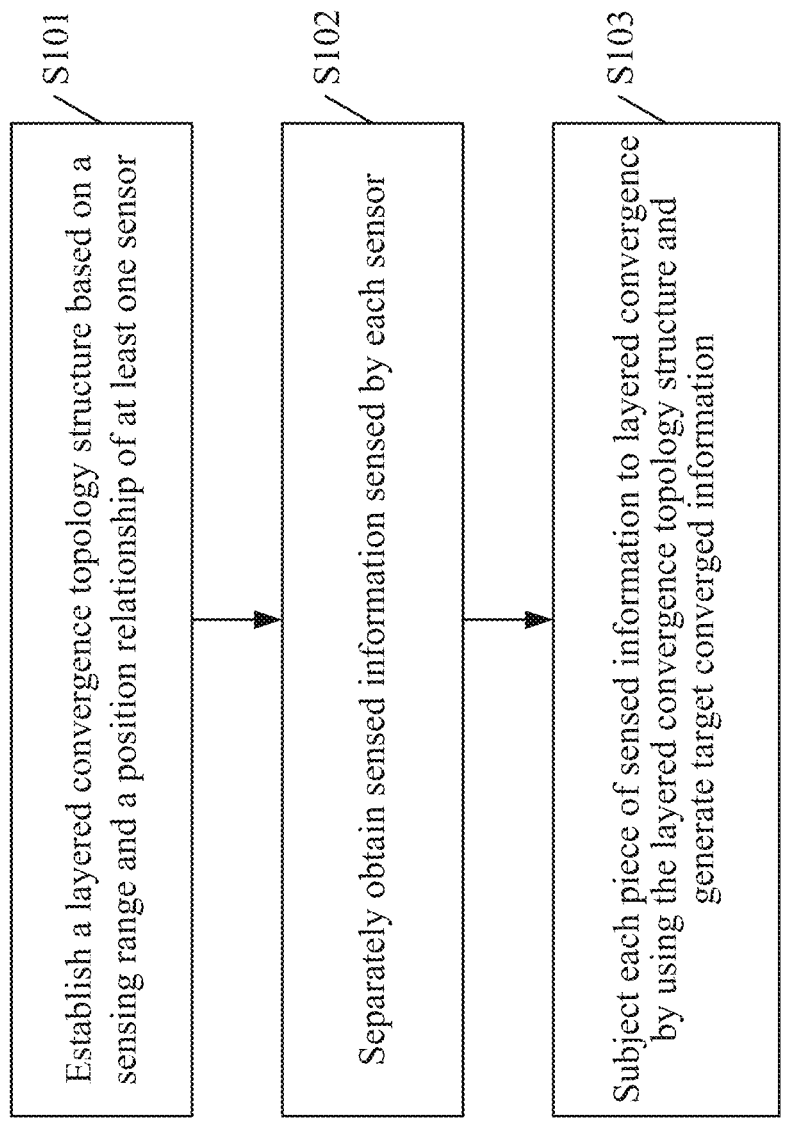
FIG. 3 is a schematic flowchart of a method for converging sensed information of multiple sensors according to an embodiment of this application.

In an embodiment, as shown in FIG. 3, a method for converging sensed information of multiple sensors is proposed. The method can be implemented through a computer program, which can run on a device for converging sensed information of multiple sensors based on the Von Neumann architecture. The computer program can be integrated into an application or run as an independent tool application.

Specifically, the method for converging sensed information of multiple sensors includes:

S101: Establish a layered convergence topology structure based on a sensing range and a position relationship of at least one sensor.

In some feasible embodiments, the sensor is a detection device for generating sensed information and converting the sensed information into an electrical signal or data in another form for output. Herein, the sensed information may include position information, motion information, and size information of the sensed target. The sensed target is an object sensed by the sensor in the sensed region. Sensed targets vary with the sensor's application scenarios. For example, when the sensor is applied to the field of smart transportation or autonomous driving, the sensed target includes at least a vehicle, a pedestrian, and the like. When the sensor is used in the field of industrial production, the sensed target can be a product or equipment during industrial production.

Herein, the sensing range refers to a range of regions that can be detected by the sensor, and the position relationship can be a relative position relationship between the sensors, for example, a sensor A is 30 meters due north of a sensor B; or the position relationship can also be an absolute position relationship, for example, using a stationary object as a reference, the sensor A is 20 meters due north of the stationary object, and the sensor B is 10 meters due south of the stationary object.

Specifically, the layered convergence topology structure is established based on the sensing range and the position relationship of each sensor. The layered convergence structure refers to a convergence structure formed by the sensors and convergence units in a preset grouping convergence method and a layered convergence method. Herein, the convergence unit is a processing unit for converging received information. It can be understood that when the convergence unit establishes a communication connection with the sensor, the information received by the convergence unit may be the sensed information sensed by the sensor; or when the convergence unit establishes a communication connection with a convergence unit in a lower convergence layer based on the preset convergence layer, the information received by the convergence unit may be converged information generated by the convergence unit in the lower convergence layer.

Figure 4:
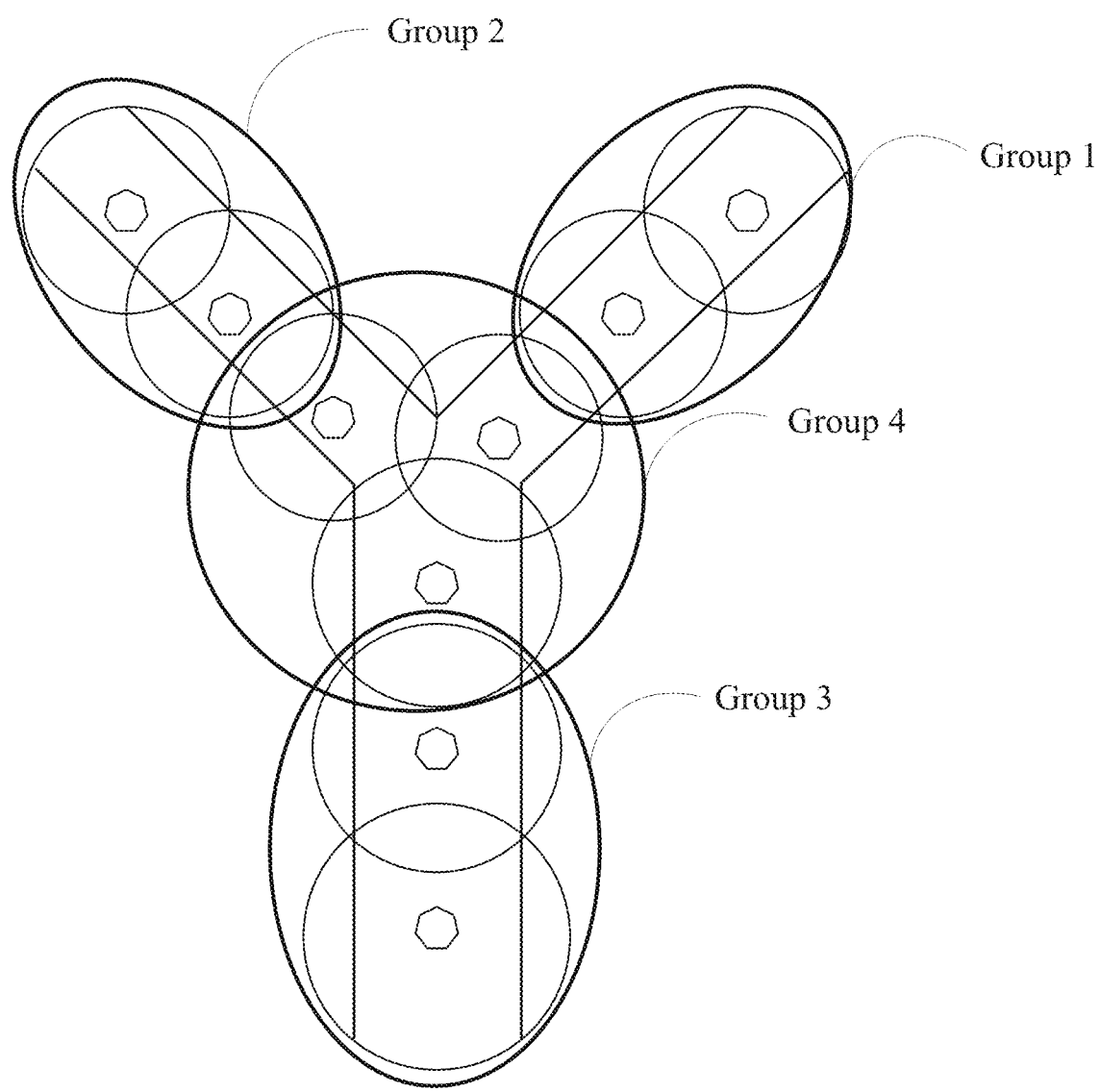
FIG. 4 is an exemplary schematic diagram of sensor grouping according to an embodiment of this application.

In the embodiments of this application, the preset grouping convergence method and the layered convergence method can be set based on the sensing range and the position relationship of the sensor. Specifically, after the sensing range and the position relationship of each sensor are determined, a first topological relationship between the sensors can be generated, and the first topological relationship can be a spatial relationship between the sensors, such as an adjacency relationship, an overlapping relationship, and a disjoint relationship. Based on the first topological relationship, the sensors are grouped, sensors having the adjacency relationship are divided into a group, and sensors having the disjoint relationship are divided into different groups. FIG. 4 is a schematic diagram of an example of feasible sensor grouping. Using a sensing range of the sensor determined to be a circular region in which the sensor is centered as an example, sensors are separately located at branch roads and an intersection of the branch roads. Therefore, a sensor at each branch road is divided into a group, to obtain a group 1, a group 2, and a group 3; and then a sensor located at the intersection between the branch roads is divided into a group, to obtain a group 4. It should be understood that a schematic shape of the sensing range is not limited to a circular shape, and may also be fan-shaped or in another shape. This is not limited in this application.

Further, each sensor is grouped to obtain multiple first groups, and each first group separately establishes a communication connection with a convergence unit in a first convergence layer. It can be understood that due to the first topological relationship between the sensors, the first groups have a second topological relationship, that is, convergence units in the first convergence layer have a second topological relationship, and the second topological relationship may be a spatial relationship between the first groups.

Further, when the sensed information is grouped and converged, converged information generated by each convergence layer is transmitted to an upper convergence layer, and then grouped and converged. It can be understood that because the convergence units in the first convergence layer have the second topological relationship, convergence units across the convergence layers and within the convergence layer also have a third topological relationship. Therefore, a layered convergence topology structure corresponding to the first topological relationship, the second topological relationship, and the third topological relationship can be established.

S102: Separately obtain sensed information sensed by each sensor.

According to some embodiments, sensed information is obtained in different ways based on different types of sensors. Using the infrared detector as an example, the infrared detector generates an infrared image for the sensed target through infrared imaging, then analyzing and processing the infrared image to obtain sensed information corresponding to the sensed target in the infrared image.

Optionally, using a radar as an example, the radar can use a frequency modulated continuous wave (FMCW) mechanism to output a millimeter wave of a specific frequency and receive an echo. When receiving an echo reflected by the sensed target, the radar calculates a frequency difference between a transmitted wave and the echo, to obtain a point data set of position and speed information of a sensed target surface, that is, a point cloud, and the point cloud is calculated by using a clustering algorithm and a tracking algorithm, to obtain the sensed information corresponding to the sensed target.

In this embodiment of this application, sensed information sensed by each sensor in the corresponding first group may be obtained by using each convergence unit in the first convergence layer in the layered convergence topology structure. For example, the convergence unit obtains and records sensed information SA, SB, and SC from a sensor A, a sensor B, and a sensor C, and timestamps TA, TB, and TC corresponding to the sensed information are recorded.

S103: Subject each piece of sensed information to layered convergence by using the layered convergence topology structure and generate target converged information.

In the layered convergence topology structure, each sensor sends the sensed information to a corresponding convergence unit for convergence, and each convergence unit sends the generated converged information to a corresponding convergence unit in an upper convergence layer for convergence, thereby implementing the layered convergence of the sensed information and generating target converged information. The target converged information refers to converged information finally obtained after each piece of sensed information is subjected to the layered convergence, which includes sensed information corresponding to each sensed target in a detected region.

In this embodiment of this application, based on a sensing range and a position relationship of at least one sensor, a layered convergence topology structure is established, the sensed information sensed by each sensor is obtained separately, each piece of sensed information is subjected to layered convergence by using the layered convergence topology structure, and target converged information is generated. Herein, compared with the method of converging the sensed information all at once, when the layered convergence topology structure is used to converge the sensed information, a data volume of the sensed information during convergence communication can be reduced, thereby reducing the bandwidth need during the convergence communication. In addition, based on the sensing range and position relationship of the sensors, the layered convergence topology structure is established, so that a communication distance can be reduced, thereby improving communication efficiency and further reducing the bandwidth need during the convergence communication.

Figure 5:
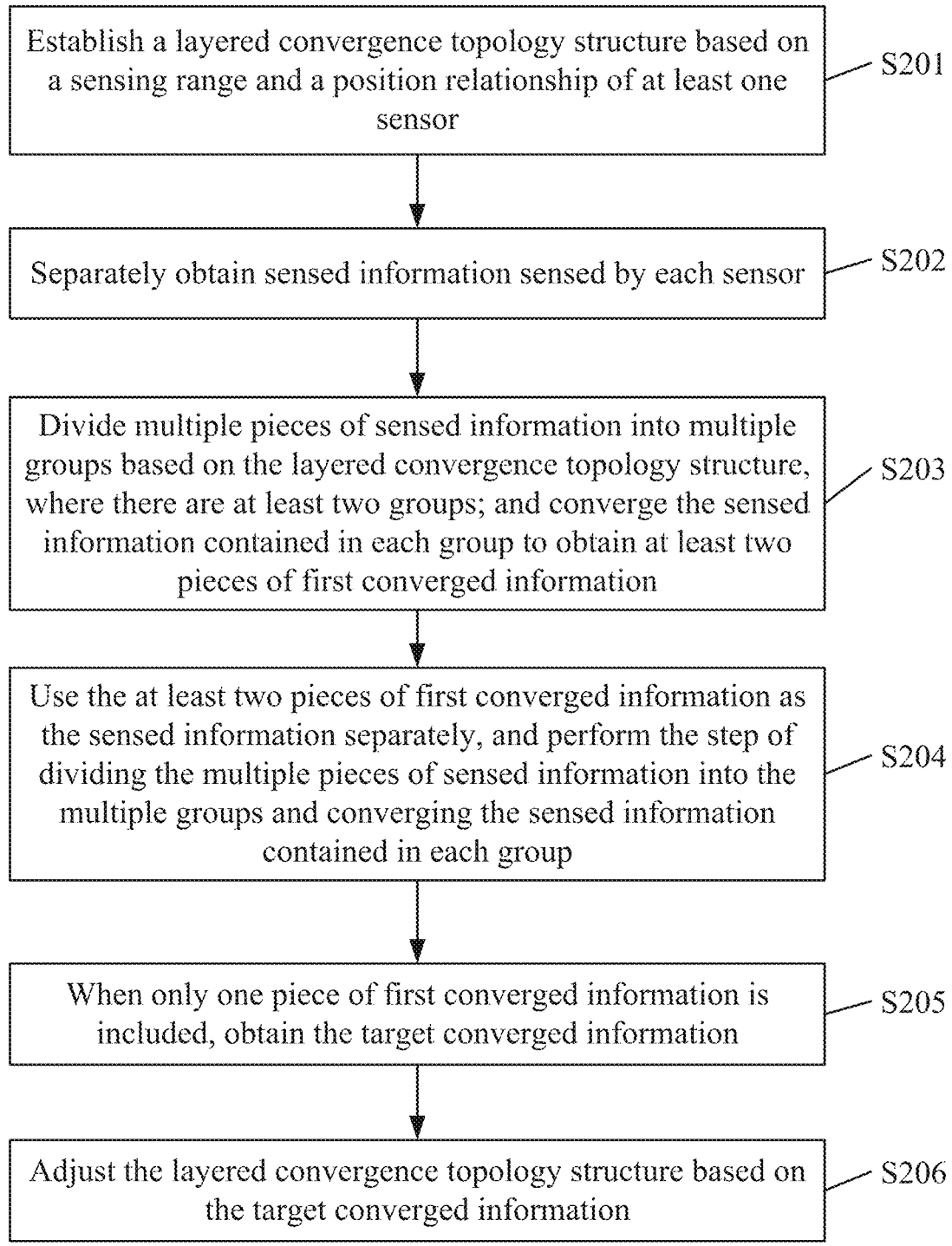
FIG. 5 is a schematic flowchart of another method for converging sensed information of multiple sensors according to an embodiment of this application.

Referring to FIG. 5, FIG. 5 is a schematic flowchart of another embodiment of a method for converging sensed information of multiple sensors according to this application. The method specifically includes the following steps:

S201: Establish a layered convergence topology structure based on a sensing range and a position relationship of at least one sensor.

For details, refer to S101. Details are not described herein again.

S202: Separately obtain sensed information sensed by each sensor.

For details, refer to S102. Details are not described herein again.

S203: Divide multiple pieces of sensed information into multiple groups based on the layered convergence topology structure, where there are at least two groups; and converge the sensed information contained in each group to obtain at least two pieces of first converged information.

Specifically, a method for grouping multiple pieces of sensed information may include dividing the multiple sensors based on a topological relationship of the sensors to obtain multiple groups, and each group includes at least two sensors. Therefore, sensed information of the sensed target that is sensed by at least two sensors in each first group forms a group, thereby grouping sensed information.

S204: Use the at least two pieces of first converged information as the sensed information separately, and perform the step of dividing the multiple pieces of sensed information into the multiple groups and converging the sensed information contained in each group.

When there are at least two pieces of first converged information, the first converged information needs to be converged again, thereby implementing layered convergence through repeated grouping and convergence. Specifically, the first converged information is used as the sensed information, and the step of dividing the multiple pieces of sensed information into the multiple groups and converging the sensed information contained in each group is performed. It should be noted that a process of grouping and layering is implemented based on the established layered topology structure, that is, the sensed information sensed by the sensor is divided into multiple groups based on the first group corresponding to each sensor, and in each convergence layer, the generated first converged information is sent to the upper convergence layer as the sensed information, and the step of dividing the multiple pieces of sensed information into the multiple groups and converging the sensed information contained in each group is performed.

For details about the step of dividing the multiple pieces of sensed information into the multiple groups and converging the sensed information contained in each group, refer to S203. Details are not described herein again.

S205: When only one piece of first converged information is included, obtain the target converged information.

When only one piece of first converged information is included, in a process of repeated grouping and layered convergence, a final converged result is obtained, that is, the target converged information is obtained.

S206: Adjust the layer convergence topology structure based on the target converged information.

In some embodiments, information density of each sensor, that is, a data volume of sensed information of each sensor, may be determined through target converged information. In some application scenarios, such as traffic roads, in three branch roads, there is large traffic on a branch road A, and therefore, sensed information sensed by a sensor of the branch road A has a large data volume. However, there is small traffic on a branch road B and a branch road C, and therefore, the sensed information sensed by the sensor of the branch road B and the branch road C has a small data volume.

In order to further resolve a problem of an excessive bandwidth need in the convergence communication process, the layered convergence topology structure is adjusted. For example, in the layered convergence topology structure, a sensor with large information density can be scheduled to a group corresponding to a sensor with small information density, or the sensor with large information density is further grouped or a convergence layer is added, and a convergence unit in the added convergence layer receives information data needing larger bandwidth during the convergence communication, which may be the sensed information or the first converged information.

Figure 6:
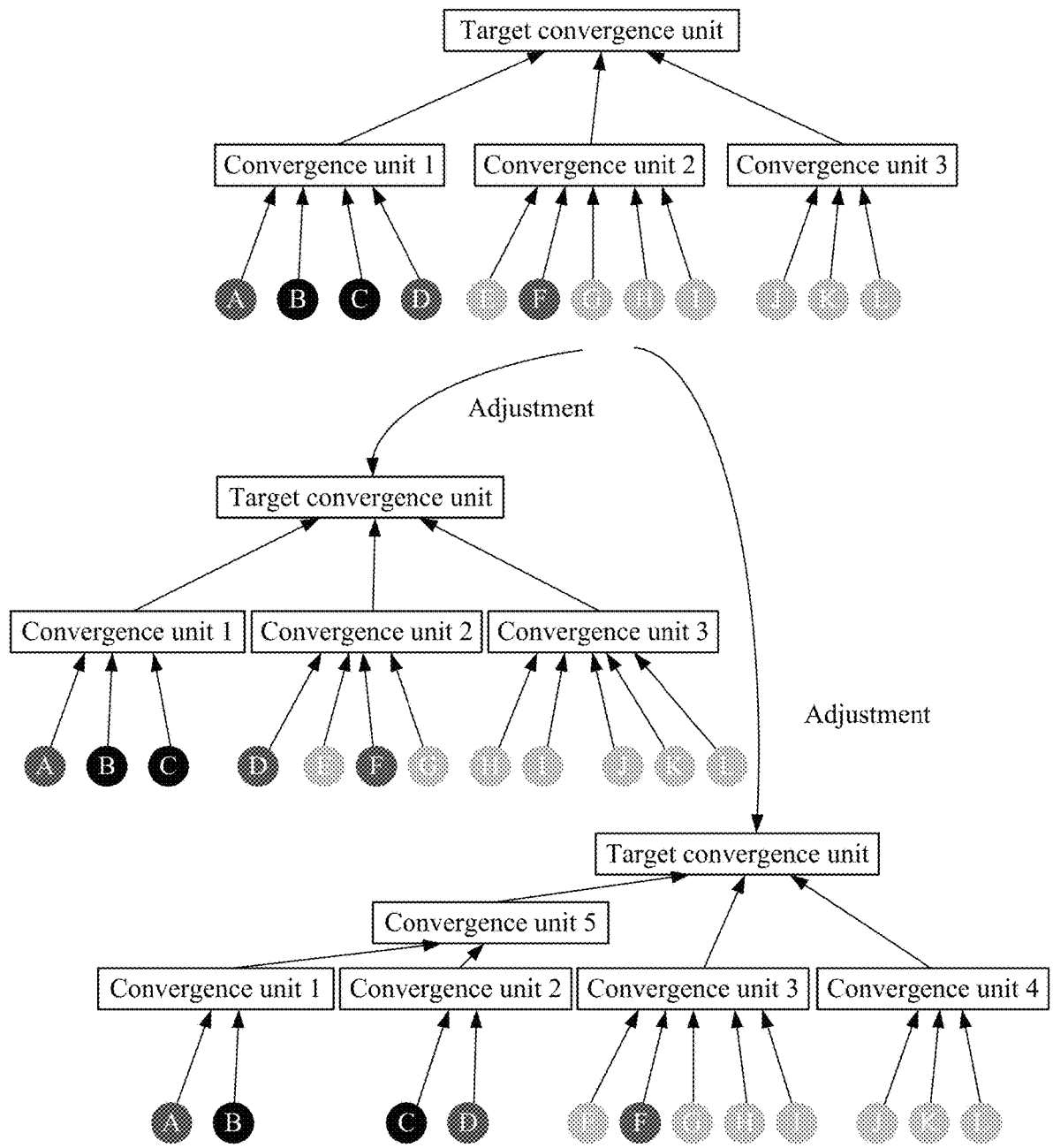
FIG. 6 is an exemplary schematic diagram of adjusting a layered convergence topology structure according to an embodiment of this application.

For example, FIG. 6 is an exemplary schematic diagram of feasible adjustment of a layered convergence topology structure. As shown in FIG. 6, sensors include sensors A, B, C, D, E, F, G, H, I, J, K, and L. Sensed information sensed by the sensor B and the sensor C has a large data volume, sensed information sensed by the sensor A, the sensor D, and the sensor F has an intermediate data volume, and sensed information of the sensor E, the sensor G, the sensor H, the sensor I, the sensor J, the sensor K, and the sensor L has a small data volume. In an initial layered topology structure, a convergence unit 1 obtains the sensed information corresponding to the sensor A, the sensor B, the sensor C, and the sensor D, and in the convergence communication process, the sensed information has a larger data volume, which needs a larger bandwidth.

It is easily understandable that a convergence unit 3 obtains the sensed information corresponding to the sensor J, the sensor K, and the sensor L, and in the convergence communication process, the sensed information has a smaller data volume, which only needs a smaller bandwidth. Therefore, the sensors can be re-grouped based on a topological relationship between the sensors and a data volume of the sensed information corresponding to the sensors, to avoid imbalance of bandwidth needs corresponding to the convergence units in the process of obtaining the sensed information (some convergence units correspond to an excessively large bandwidth need, and some other convergence units correspond to a smaller bandwidth need). Therefore, it can be determined that the sensor A, the sensor B, and the sensor C are one group, the sensor D, the sensor E, the sensor F, and the sensor G are one group, and the sensor H, the sensor I, the sensor J, the sensor K, and the sensor L are one group.

Optionally, one convergence unit is added to the first convergence layer, the sensor A, the sensor B, the sensor C, and the sensor D are further grouped, so that the sensor A and the sensor B are one group and correspond to the convergence unit 1, and the sensor C and the sensor D are one group and correspond to the convergence unit 2. Further, one convergence layer may be added, and a convergence unit 5 in the convergence layer establishes a communication connection with the convergence unit 1 and the convergence unit 2 and converges the converged information corresponding to the convergence unit 1 and the converged information corresponding to the convergence unit 2.

In this embodiment of this application, based on a sensing range and a position relationship of at least one sensor, a layered convergence topology structure is established, the sensed information sensed by each sensor is obtained separately, each piece of sensed information is subjected to layered convergence by using the layered convergence topology structure, and target converged information is generated. Herein, compared with the method of converging the sensed information all at once, when the layered convergence topology structure is used to converge the sensed information, a data volume of the sensed information during convergence communication can be reduced, thereby reducing the bandwidth need during the convergence communication. In addition, based on the sensing range and position relationship of the sensors, the layered convergence topology structure is established, so that a communication distance can be reduced, thereby improving communication efficiency and further reducing the bandwidth need during the convergence communication. Further, the layered convergence topology structure can be adjusted by reading the target converged information, to more accurately resolve the problem of the bandwidth need.

Figure 7:
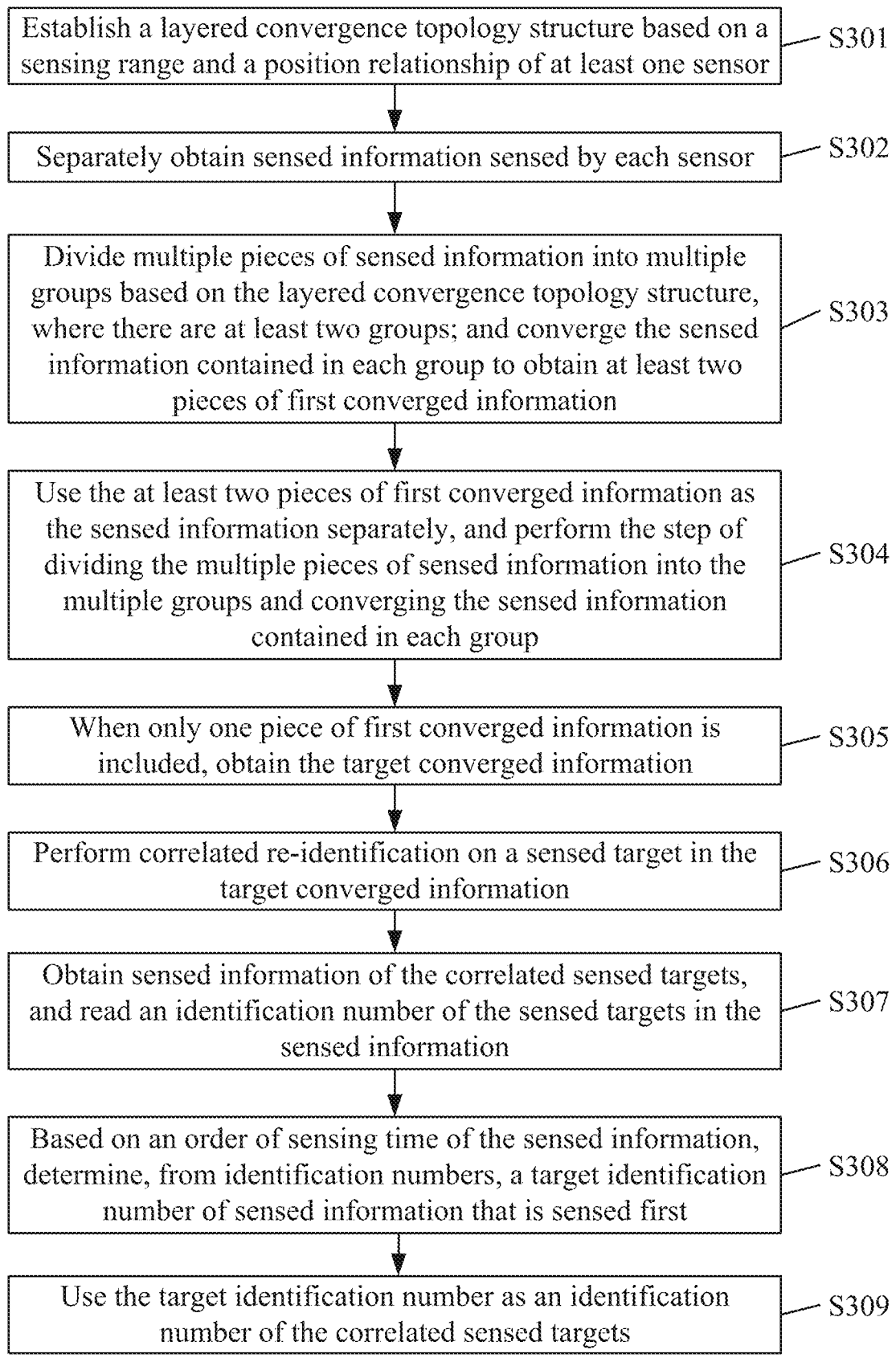
FIG. 7 is a schematic flowchart of another method for converging sensed information of multiple sensors according to an embodiment of this application.

Referring to FIG. 7, FIG. 7 is a schematic flowchart of another embodiment of a method for converging sensed information of multiple sensors according to this application. The method specifically includes the following steps:

S301: Establish a layered convergence topology structure based on a sensing range and a position relationship of at least one sensor.

For details, refer to S101. Details are not described herein again.

S302: Separately obtain sensed information sensed by each sensor.

Specifically, the sensed information sensed by the sensor includes sensed information corresponding to the sensed target sensed by the sensor, and sensed information of a sensed target of each sensor is separately stored in the following array:

$$S_T = \{S_{T,0}^1, \ldots, S_{T,k}^1\}, \ldots, \{S_{T,0}^N, \ldots, S_{T,m}^N\}$$

where $S_T$ represents a sensed information set of a sensed target of multiple sensors at a moment T; $S_{T,b}^A$ represents sensed information of a sensed target b of a sensor A at a moment T; and therefore, $S_{T,k}^1$ represents sensed information of a sensed target k of a sensor 1 at a moment T, and $S_{T,m}^N$ represents sensed information of a sensed target m of a sensor N at a moment T.

In some embodiments, sensed information of each sensed target includes position information (such as coordinates of a center of the sensed target in a coordinate system set by the sensor), motion information (such as a heading angle, a speed, and acceleration), and size information (a length, a width, and a height) of the sensed target.

S303: Divide multiple pieces of sensed information into multiple groups based on the layered convergence topology structure, where there are at least two groups; and converge the sensed information contained in each group to obtain at least two pieces of first converged information.

Figure 8:
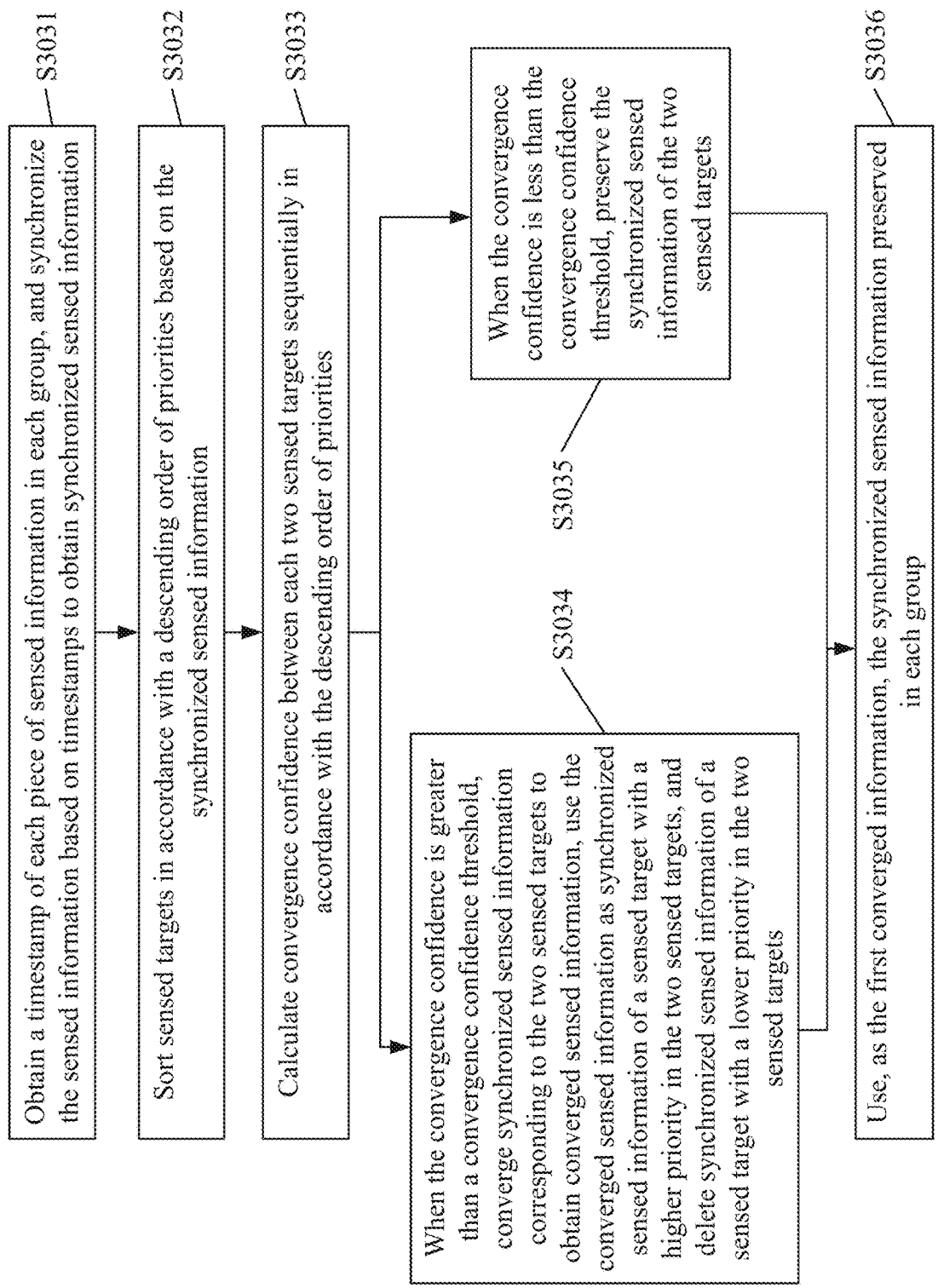
FIG. 8 is a schematic flowchart of a method for obtaining first converged information according to an embodiment of this application.

In some embodiments, referring to FIG. 8, FIG. 8 is a schematic flowchart of a method for obtaining first converged information. The method specifically includes the following steps:

S3031: Obtain a timestamp of each piece of sensed information in each group, and synchronize the sensed information based on timestamps to obtain synchronized sensed information.

It should be noted that the timestamp refers to time at which the sensor obtains the sensed information of the sensed target in a sensing cycle. In this application, a specific moment in the sensing cycle may be selected as a timestamp for the sensed information according to a preset rule. The preset rule may be selecting a start moment or an end moment in the cycle as the timestamp for the sensed information, or selecting a moment that is a preset duration away from the start moment as the timestamp for the sensed information. The timestamp may be stored in the sensed information as sensed sub-information of sensed information.

Specifically, because there is a time difference between sensed information of the sensors, the sensed information needs to be synchronized based on the timestamp. A method for synchronizing each piece of sensed information is as follows: calculating a synchronization timestamp corresponding to a target group in groups; calculating a difference between the synchronization timestamp and each timestamp in the target group, and performing motion compensation on each piece of sensed information based on the difference to obtain synchronized sensed information of the target group; obtaining a next group in the groups, using the next group as the target group, and performing the step of calculating the synchronization timestamp corresponding to the target group in the groups; and when there is no next group, generating synchronized sensed information corresponding to each group.

It is easily understandable that, in a group, a method for synchronizing a sensed information, which is used to synchronize the sensed information to the synchronization timestamp, includes cycle synchronization and real-time synchronization.

The cycle synchronization refers to calculating a synchronization timestamp based on a timestamp of each piece of sensed information in a cycle of obtaining sensed information of each sensor, and calculating the difference between the synchronization timestamp and each of the timestamps in the target group, and performing motion compensation on each piece of sensed information based on the difference to obtain synchronized sensed information of the target group; obtaining a next group in the groups, using the next group as the target group, and performing the step of calculating the synchronization timestamp corresponding to the target group in the groups; and when there is no next group, generating synchronized sensed information corresponding to each group.

Figure 9:
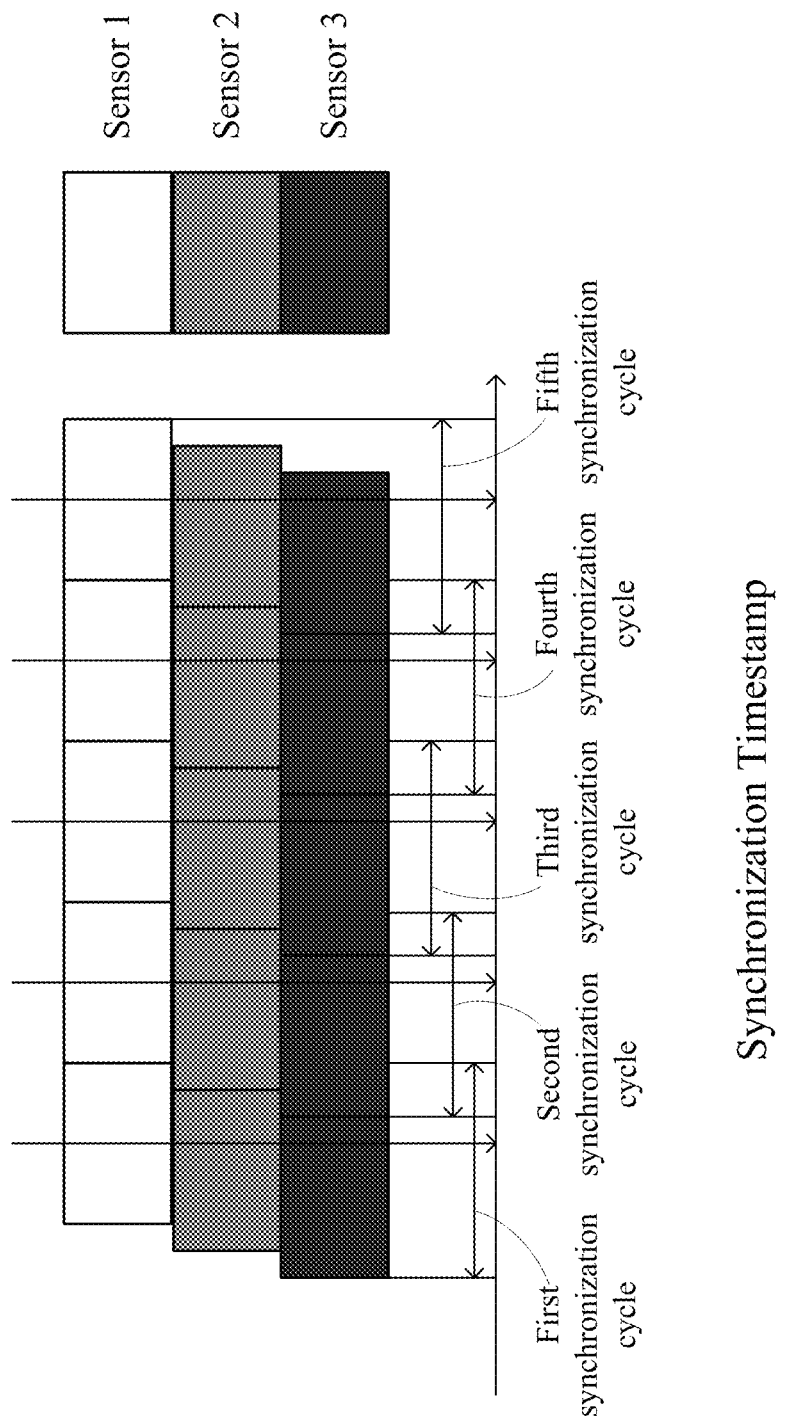
FIG. 9 is an exemplary schematic diagram of cyclic synchronization according to an embodiment of this application.

FIG. 9 is an exemplary schematic diagram of cycle synchronization. Using three sensors as an example, a sensor 1, a sensor 2, and a sensor 3 need to be synchronized. Because sensed information of sensors arrives at the convergence unit at different moments, the cycle synchronization method is executed in a synchronization cycle, after sensed information of the sensor 3, the sensor 2, and the sensor 1 arrives at the convergence unit in sequence, obtaining a timestamp of the sensed information that has arrived, calculating a synchronization timestamp corresponding to each timestamp, and in each synchronization cycle, synchronizing sensed information that has arrived.

It should be noted that a method for calculating the synchronization timestamp includes: determining a first target timestamp of first obtained sensed information in the group; calculating a first difference between each timestamp and the first target timestamp, and determining a second difference that is among the first differences and less than a time difference threshold; storing a first timestamp corresponding to each second difference into a first set; calculating a first average of first timestamps, and using the first average as a second target timestamp; calculating a third difference between a second timestamp other than the first timestamp in the timestamps and the second target timestamp, and determining each fourth difference that is among the third differences and less than the time difference threshold; storing each third timestamp corresponding to each fourth difference into a second set; and calculating a timestamp average of each first timestamp in the first set and each third timestamp in the second set, and using the timestamp average as the synchronization timestamp.

Figure 10:
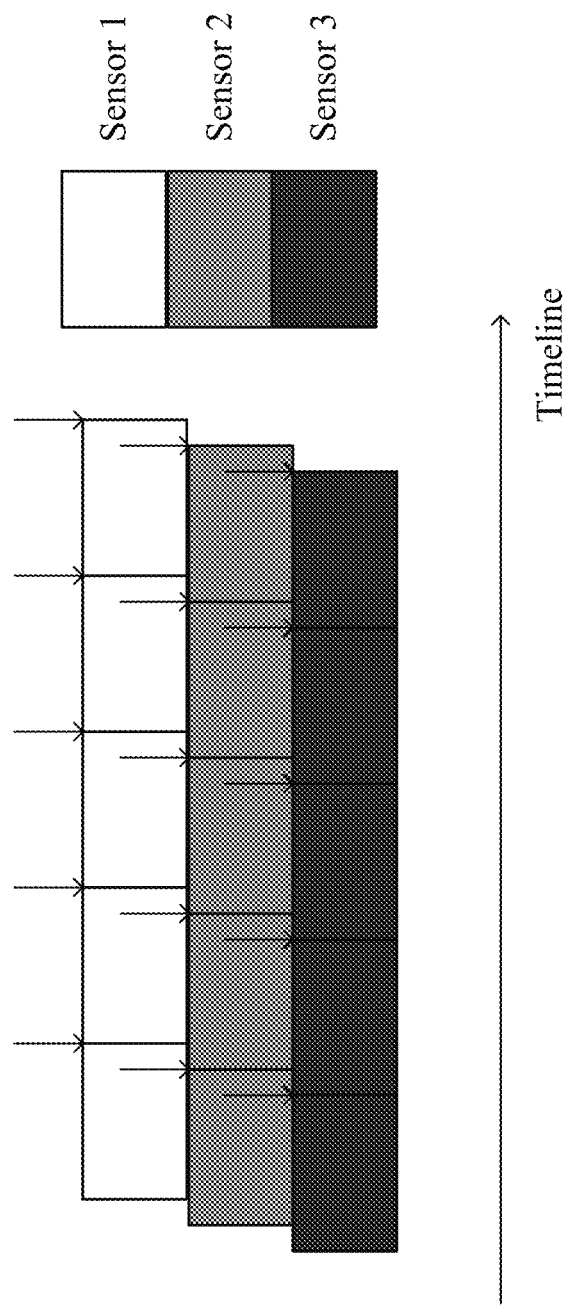
FIG. 10 is an exemplary schematic diagram of real-time synchronization according to an embodiment of this application.

The real-time synchronization means that every time the convergence unit obtains sensed information of a sensor within a synchronization cycle, the obtained sensed information is synchronized once. FIG. 10 is an exemplary schematic diagram of real-time synchronization. A sensor 1, a sensor 2, and a sensor 3 need to be synchronized. Because sensed information of the sensors arrives at the convergence unit at different moments, each time the convergence unit obtains sensed information of one of the sensors, the obtained sensed information is synchronized once.

Specifically, the obtained sensed information is used as sensed information in a synchronization cycle in the cycle synchronization method to perform synchronization. For details, refer to the cycle synchronization method. Details are not described herein again.

It should be noted that a motion compensation method may perform motion compensation on the sensed information through a uniform rectilinear motion, or through a uniformly accelerated rectilinear motion. For example, when the motion compensation is performed on the sensed information through the uniform rectilinear motion, motion information and size information in the sensed information remain unchanged, the position information is synchronized, and the position information is coordinates (x, y, z) in a preset coordinate system of a to-be-sensed region. The motion information includes a speed $(v_x, v_y, v_z)$ and acceleration $(a_x, a_y, a_z)$, and therefore, a motion compensation formula is:

$$(x', y', z') = (x, y, z) + (T_{sync} - T_1) \times (v_x, v_y, v_z)$$

Herein, $T_{sync}$ is a synchronization timestamp, and $T_1$ is a timestamp of the sensed information.

S3032: Sort sensed targets in accordance with a descending order of priorities based on the synchronized sensed information.

Priorities refer to priorities between the sensed targets. Herein, the priority is calculated based on the synchronized sensed information of the sensed target.

Specifically, the sorting of sensed targets in accordance with a descending order of priorities based on the synchronized sensed information includes: obtaining each piece of sensed sub-information from the synchronized sensed information; performing a weighted sum operation on each piece of sensed sub-information and weight separately based on the preset weight corresponding to each piece of sensed sub-information, to obtain a priority of the synchronized sensed information; and sorting the sensed targets in accordance with the descending order of priorities.

For example, to calculate the priority of the sensed target, the synchronized sensed information of the sensed target includes a distance of DistCenter(x) between the sensed target and the sensor, size information of Area(x) of the sensed target, continuous detection time of liveTime (x) of the sensor for the sensed target, and detection confidence of Confidence (x) of the sensed target. It is easily understandable that the shorter the distance between the sensed target and the sensor is, the higher the priority is; the closer the size information of the sensed target is to reference size information of a category corresponding to the sensed target, the higher the priority is; the longer the continuous detection time of the sensor for the sensed target, the higher the priority is; and the higher the detection confidence of the sensed target is, the higher the priority is. Therefore, a priority calculation function is:

$$F_p(x) = \lambda_1 \times \text{DistCenter}(x) + \lambda_2 \times \text{Area}(x) + \lambda_3 \times \text{liveTime}(x) + \lambda_4 \times \text{Confidence}(x)$$

Herein, $\lambda_1+\lambda_2+\lambda_3+\lambda_4=1$, and a weighted operation is performed on the distance, the size information, the continuous detection time, and the detection confidence, to obtain a priority function value of the sensed target. A descending order of priority function values of the sensed targets is a descending order of priorities.

S3033: Calculate convergence confidence between each two sensed targets sequentially in accordance with the descending order of priorities.

The convergence confidence is a value for measuring confidence of convergence between two sensed targets.

Specifically, the method for calculating the convergence confidence includes: obtaining sensed information of each two sensed targets sequentially in accordance with the descending order of priorities; calculating overlap and similarity between the two sensed targets based on the sensed information of the two sensed targets; and performing a weighted operation based on the overlap and the similarity, to obtain the convergence confidence between the two sensed targets.

In some embodiments, the overlap refers to a value for measuring the overlap of the two sensed targets. Herein, a method for calculating the overlap may be a ratio of an area of an overlapped region of the two sensed targets to an area of a non-overlapped region, or a ratio of an area of the overlapped region of the two sensed targets to an area of a total region.

In some embodiments, similarity refers to a value for measuring appearance similarity of the two sensed targets, or may be a value for measuring outline similarity of the two sensed targets. Herein, a similarity calculation method includes but is not limited to: Euclidian Distance, Manhattan Distance, Minkowski Distance, Cosine Similarity, and Pearson Correlation Coefficient.

For example, the overlap between the two sensed targets is IOU(x, y), the similarity between two sensed targets is DistFeature(x, y), and therefore, a formula for calculating the convergence confidence between the two sensed targets is:

$$F_c(x, y) = \lambda_1 \times IOU(x, y) \lambda_2 \times \text{DistFeature}(x, y)$$

Herein, $\lambda_1+\lambda_2=1$, where $F_c(x, y)$ is the convergence confidence between the two sensed targets.

S3034: When the convergence confidence is greater than a convergence confidence threshold, converge synchronized sensed information corresponding to the two sensed targets to obtain converged sensed information, use the converged sensed information as synchronized sensed information of a sensed target with a higher priority in the two sensed targets, and delete synchronized sensed information of a sensed target with a lower priority in the two sensed targets.

When the convergence confidence is greater than the convergence confidence threshold, it is determined that the two sensed targets are actually one sensed target in the to-be-sensed region, and therefore, the two sensed targets are converged.

Specifically, if the sensed information includes the size information, the position information, and the motion information, converging the sensed information of the two sensed targets includes: using size information of a sensed target with a high priority as size information in the converged sensed information; and if continuous sensing time of the two sensed targets is greater than a time threshold, performing a weighted operation on position information of the two sensed targets based on weight of the continuous sensing time to obtain position information in the converged sensed information, and performing a weighted operation on motion information of the two sensed targets based on the weight of the continuous sensing time to obtain motion information in the converged sensed information; or if the continuous sensing time of the two sensed targets is less than the time threshold, calculating an average of the position information and an average of the motion information of the two sensed targets, using the average of the position information as the position information in the converged sensed information, and using the average of the motion information as the motion information in the converged sensed information.

Optionally, when it is determined that the convergence confidence between the multiple sensed targets is greater than the convergence confidence threshold, the multiple sensed targets are converged. Herein, to-be-converged sensed targets include a sensed target with a high priority (denoted as a set $S_{high}$) and a sensed target with a low priority (denoted as a set $S_{low}$). Convergence of the sensed information of the sensed targets includes size information convergence, position information convergence, and motion information convergence.

Size information convergence: an average of the size information in the set $S_{high}$ is calculated, and the average is used as the converged size information.

Position information convergence: the weighted operation or average calculation is performed based on the method for converging position information of the two sensed targets. For details, refer to the foregoing calculation method. Details are not described herein again.

Size information convergence: the weighted operation or average calculation is performed based on the method for converging size information of the two sensed targets. For details, refer to the foregoing calculation method. Details are not described herein again.

S3035: When the convergence confidence is less than the convergence confidence threshold, preserve the synchronized sensed information of the two sensed targets.

When the convergence confidence is less than the convergence confidence threshold, it is determined that the two sensed targets are still two sensed targets in the to-be-sensed region. Therefore, the two sensed targets are not converged, and synchronized sensed information of the two sensed targets is preserved.

S3036: Use the synchronized sensed information preserved in each group as the first converged information.

It is determined, through the convergence confidence threshold, whether the sensed target corresponding to the obtained synchronized sensed information is a sensed target in an actual to-be-sensed region. If yes, the convergence is performed and the converged information is preserved; or if not, the synchronized sensed information of the two sensed targets is both preserved. Therefore, a final preserved result is the first converged information.

S304: Use the at least two pieces of first converged information as the sensed information separately, and perform the step of dividing the multiple pieces of sensed information into the multiple groups and converging the sensed information contained in each group.

For details, refer to S204. Details are not described herein again.

S305: When only one piece of first converged information is included, obtain the target converged information.

For details, refer to S205. Details are not described herein again.

S306: Perform correlated re-identification on a sensed target in the target converged information.

Specifically, in a layered convergence topology structure, there is an overlapped region between sensed regions corresponding to at least two sensors. Because identification numbers in sensed information sensed by different sensors for a same sensed target are different in the overlapped region, a relative attribute of the sensed target is lost, and the sensed target cannot be globally tracked.

Figure 11:
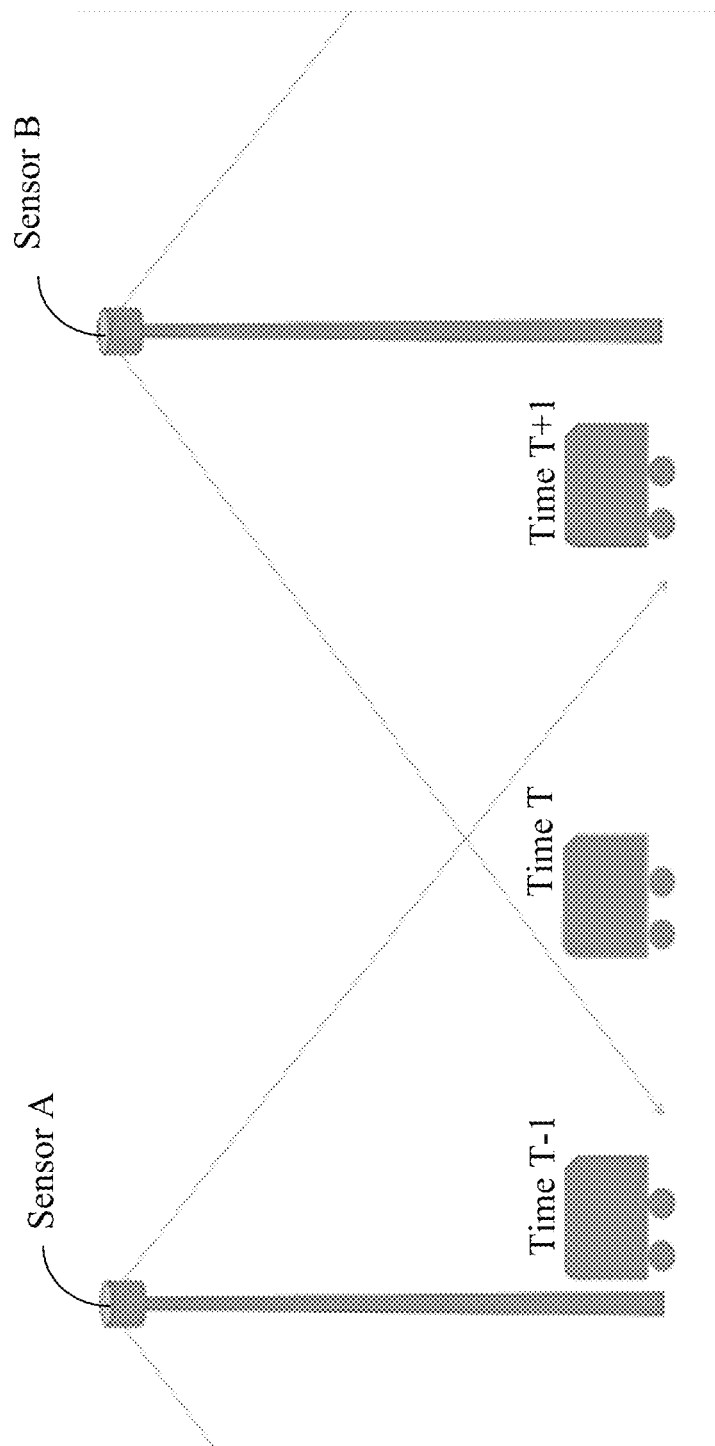
FIG. 11 is an exemplary schematic diagram of correlation of sensed targets according to an embodiment of this application.

As shown in FIG. 11, in target converged information at a moment T−1, a sensor A senses first sensed information of a vehicle, and the vehicle is in target converged information at a moment T; and the sensor A senses second sensed information of the vehicle, a sensor B senses third sensed information of the vehicle, and the sensor B senses fourth sensed information of the vehicle. Herein, the sensor A locally tracks the vehicle, identification numbers of the first sensed information and the second sensed information is "vehicle 1," the sensor B locally tracks the vehicle, and identification numbers of the third sensed information and the fourth sensed information are "vehicle 2." Therefore, when the vehicle passes by the overlapped region of the sensor A and the sensor B, a relative position attribute is lost, and therefore, the vehicle cannot be tracked globally.

In order to resolve the foregoing problem, in this embodiment of this application, correlated re-identification is performed on the sensed target in the target converged information. Specifically, the sensed target located in the first overlapped region is obtained from the target converged information. Herein, the first overlapped region exists between sensed regions of adjacent sensors, correlation of sensed targets located in the first overlapped region is calculated, and if correlation of the two sensed targets is greater than a correlation threshold, the two sensed targets are determined as correlated sensed targets.

Figure 12:
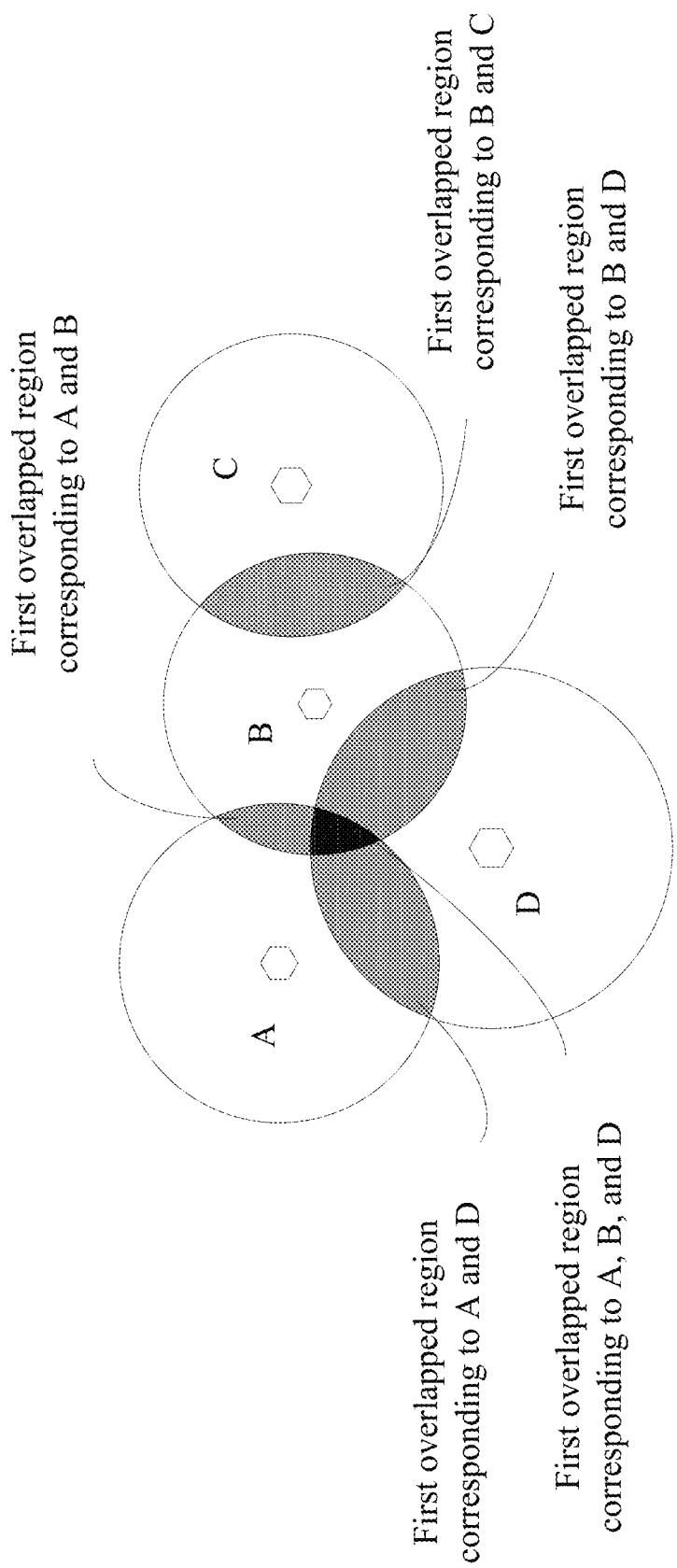
FIG. 12 is an exemplary schematic diagram of a first overlapped region according to an embodiment of this application.

It should be noted that the first overlapped region refers to an overlapped region of the sensed regions of the adjacent sensors. Herein, there are at least two adjacent sensors. That is, the first overlapped region may be an overlapped region of sensed regions of two adjacent sensors, or may alternatively be an overlapped region of sensed regions of three adjacent sensors. For example, FIG. 12 is an exemplary schematic diagram of a first overlapped region. A sensor A, a sensor B, a sensor C, and a sensor D are included. Herein, sensed regions of the sensor A, the sensor B, and the sensor D are overlapped, and sensed regions of the sensor B and the sensor C are overlapped. Therefore, first overlapped regions of the sensors include a first overlapped region corresponding to the sensor A and the sensor B, a first overlapped region corresponding to the sensor B and the sensor C, a first overlapped region corresponding to the sensor B and the sensor D, a first overlapped region corresponding to the sensor A and the sensor D, and a first overlapped region corresponding to the sensor A, the sensor B, and the sensor D.

As shown in FIG. 11, at the moment T, the vehicle is located in the first overlapped region, and in the target converged information at the moment T, second sensed information sensed by the sensor A for the vehicle is converged with third sensed information sensed by the sensor B for the vehicle, and the sensed information of the vehicle in target converged information at the moment T is correlated with the sensed information of the vehicle in target converged information at the moment T−1.

Optionally, a method for calculating correlation may be: establishing a correlation matrix of each sensed target located in the first overlapped region. Herein, the correlation matrix is established based on the position information, the motion information, the size information, and the type information of the sensed target. Specifically, a formula for calculating a distance of the sensed target in the correlation matrix is as follows:

$$\mathrm{dist}(x, y) = N(x, y) * \mathrm{distAsso}(x, y)$$

Herein, $N(x, y)$ represents an adjacency relationship between the two sensed objects, and $\mathrm{distAsso}(x, y)$ represents a distance between two objects. Specifically, if two sensed targets are adjacent to each other, a value of $N(x, y)$ is set to 1; otherwise, the value of $N(x, y)$ is set to be greater than 1. For ease of calculation, a value of a distance between two objects with a non-adjacency relationship can be directly set to "infinity," to reduce unnecessary calculation. Herein, $\mathrm{distAsso}(x, y)$ is calculated by performing weighted operation on a position distance, a motion direction distance, a size, and a type distance.

Optionally, a correlation algorithm may further be a graph neural network (GNN) algorithm.

Figure 13:
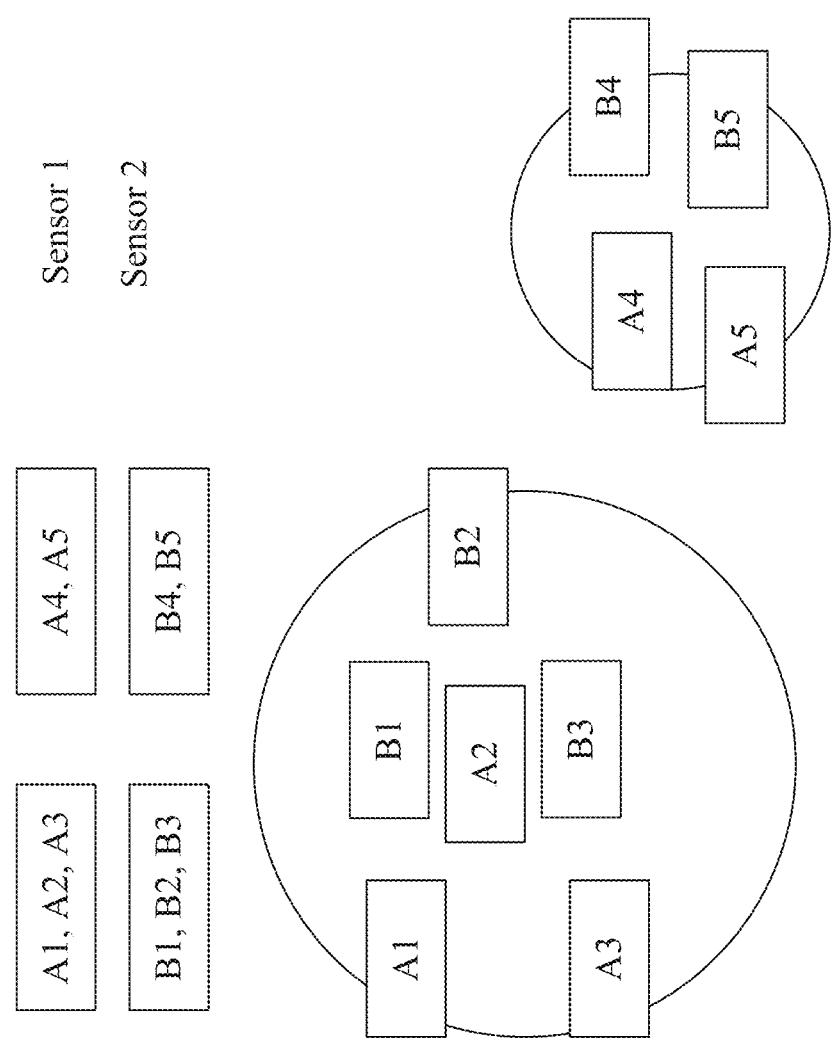
FIG. 13 is an exemplary schematic diagram of division of a bipartite graph according to an embodiment of this application.

Herein, the standard Hungarian algorithm can be used for processing, to ensure optimal global matching. In addition, a proper threshold related to an application scenario is set, so that correlation efficiency of the algorithm can be further improved. FIG. 13 is an exemplary schematic diagram of division of a bipartite graph. A{1, . . . , 5} represents sensed targets of a sensor 1, and B{1, . . . , 5} represents sensed targets of a sensor 2. A large global bipartite graph is divided into multiple non-overlapped subgraphs for processing. That is, bipartite matching of {A1, . . . , A5, B1, B5} is changed into bipartite matching of two subgraphs of {A1, . . . , A3, B1, . . . , B3} and {A4, A5, B4, B5} through division, thereby improving correlation efficiency.

S307: Obtain sensed information of the correlated sensed targets, and read an identification number of the sensed targets in the sensed information.

It is easily understandable that in the to-be-sensed region, the sensed target is continuously sensed by each sensor, and is not only sensed by a single sensor. Even when the sensed target moves in the first overlapped region, identification of the sensed target is not ended, without requiring a new sensor to re-identify the sensed target. In the method of correlation re-identification, the sensed information of the correlated sensed target is obtained, an identification number of the sensed target in the sensed information is read, and the read identification number is modified into a uniform identification number, so that one sensed target has only one identification number in the multiple sensors and is continuously identified by the multiple sensors, thereby implementing global tracking of the sensed target.

S308: Based on an order of sensing time of the sensed information, determine, from identification numbers, a target identification number of sensed information that is sensed first.

The order of the sensing time refers to the order of sensing the sensed targets by the sensor.

Specifically, it is determined that the sensed target is first identified by sensor and as a result, the target identification number is generated. For example, if the vehicle travels from a sensed region of the sensor 1 to a sensed region of the sensor 2, the vehicle is first sensed by the sensor 1, and a first identification number is generated. In this case, the first identification number is a target identification number of sensed information that is sensed first.

S309: Use the target identification number as an identification number of the correlated sensed targets.

It is easily understandable that, to avoid loss of a relative position attribute of the sensed target in different sensors, the target identification number is used as an identification number of correlated sensed targets.

For example, when the vehicle travels to the overlapped region of the sensor 1 and the sensor 2, the sensor 1 locally tracks the vehicle, and therefore, at this time, the identification number of the vehicle is still the first identification number, and then the sensor 2 senses the vehicle and generates a second identification number for the vehicle. Herein, second sensed information corresponding to the second identification number and first sensed information corresponding to the first identification number are actually sensed information identified by different sensors for the same object. Therefore, the sensed target corresponding to the first sensed information is correlated with the sensed target corresponding to the second sensed information, and the second identification number is replaced with the first identification number.

In this embodiment of this application, based on a sensing range and a position relationship of at least one sensor, a layered convergence topology structure is established, the sensed information sensed by each sensor is obtained separately, each piece of sensed information is subjected to layered convergence by using the layered convergence topology structure, and target converged information is generated. Herein, compared with the method of converging the sensed information all at once, when the layered convergence topology structure is used to converge the sensed information, a data volume of the sensed information during convergence communication can be reduced, thereby reducing the bandwidth need during the convergence communication. In addition, based on the sensing range and position relationship of the sensors, the layered convergence topology structure is established, so that a communication distance can be reduced, thereby improving communication efficiency and further reducing the bandwidth need during the convergence communication. Further, the layered convergence topology structure can be adjusted by reading the target converged information, to more accurately resolve the problem of the bandwidth need. In addition, the correlation re-identification is performed on the sensed target in the target converged information, so that global tracking of the sensed target can be implemented.

Figure 14:
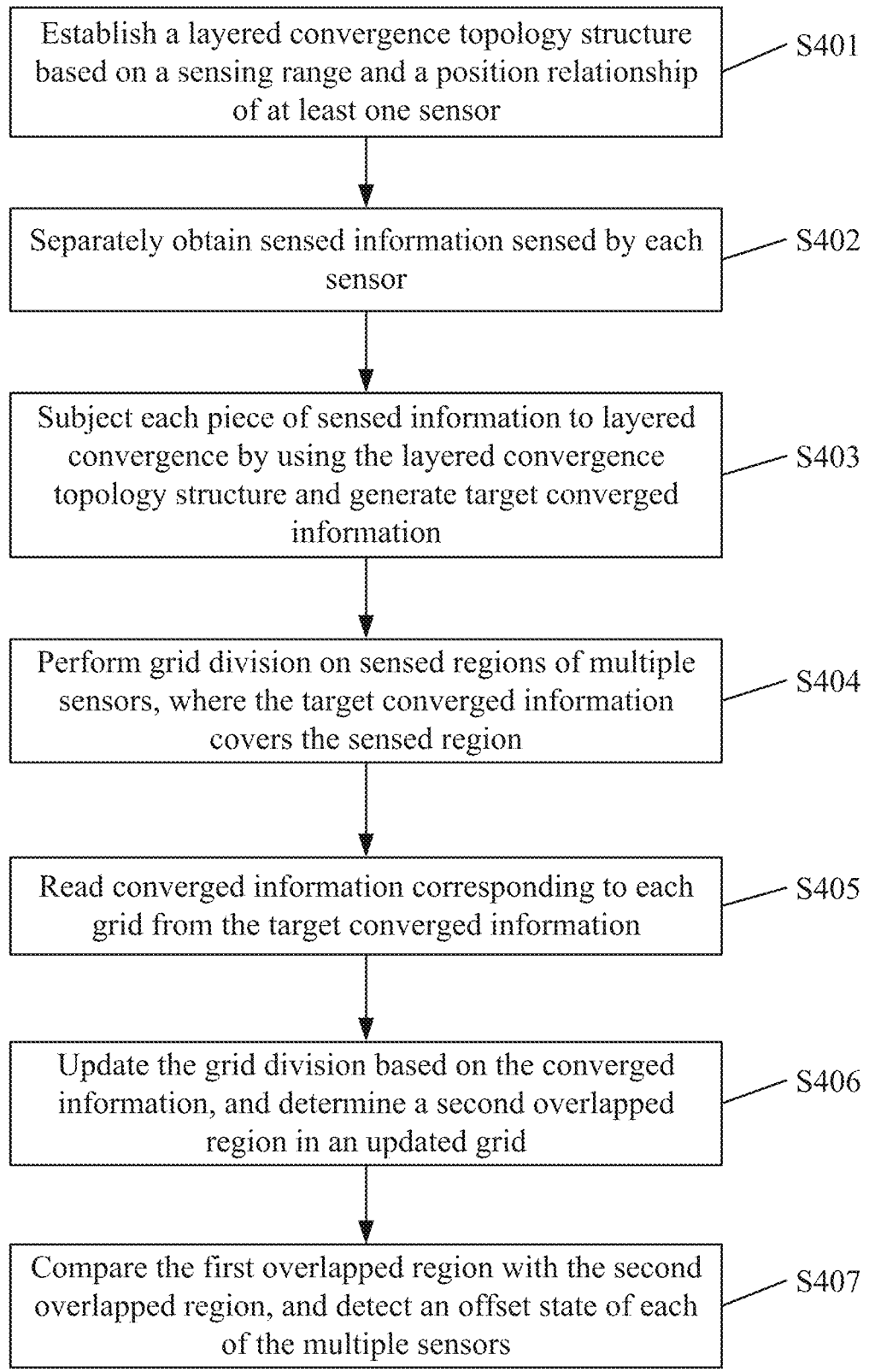
FIG. 14 is a schematic flowchart of another method for converging sensed information of multiple sensors according to an embodiment of this application.

Referring to FIG. 14, FIG. 14 is a schematic flowchart of another embodiment of a method for converging sensed information of multiple sensors according to this application. The method specifically includes the following steps:

S401: Establish a layered convergence topology structure based on a sensing range and a position relationship of at least one sensor.

For details, refer to S101. Details are not described herein again.

S402: Separately obtain sensed information sensed by each sensor.

For details, refer to S102. Details are not described herein again.

S403: Subject each piece of sensed information to layered convergence by using the layered convergence topology structure and generate target converged information.

For details, refer to S103. Details are not described herein again.

S404: Perform correlated re-identification on a sensed target in the target converged information.

For details, refer to S306. Details are not described herein again.

S405: Perform grid division on sensed regions of multiple sensors, where the target converged information covers the sensed region.

The sensed regions of the multiple sensors include an overlapped region and a non-overlapped region. Therefore, when the grid division is performed on the sensed regions of the multiple sensors, a topology relationship needs to be first established between the multiple sensors.

Figure 15:
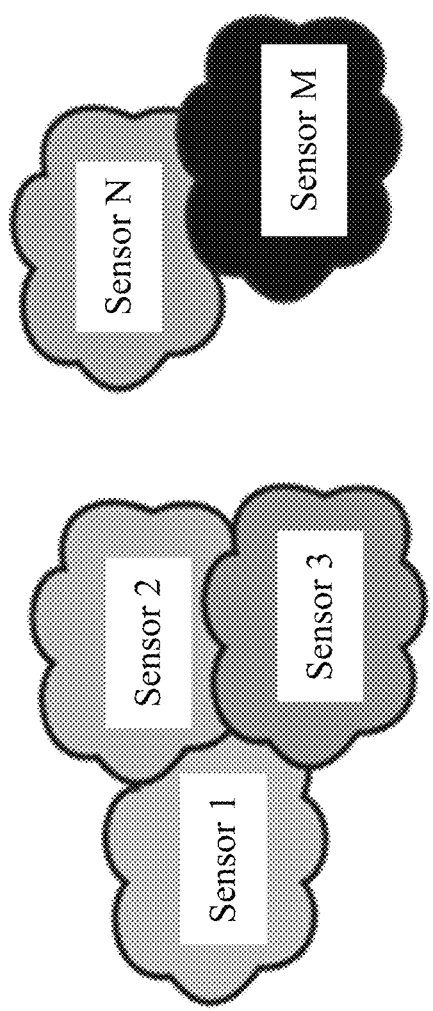
FIG. 15 is an exemplary schematic diagram of adjacent matrices according to an embodiment of this application.

Specifically, the topology relationship is expressed in a form of an adjacent matrix. For example, FIG. 15 is an exemplary schematic diagram of an adjacent matrix. The sensor 1, the sensor 2, and the sensor 3 are adjacent to each other, and a sensor N is adjacent to a sensor M, then the adjacent matrix is expressed below:

| Sensor Number | 1 | 2 | 3 | N | M |
|---|---|---|---|---|---|
| 1 | 1 | 1 | 1 | | |
| 2 | 1 | 1 | 1 | | |
| 3 | 1 | 1 | 1 | | |
| N | | | | 1 | 1 |
| M | | | | 1 | 1 |

Herein, a value of "1" indicates that there is an adjacency relationship between the sensor i and the sensor j; otherwise, it indicates that the sensor i and the sensor j are not adjacent.

Figure 16:
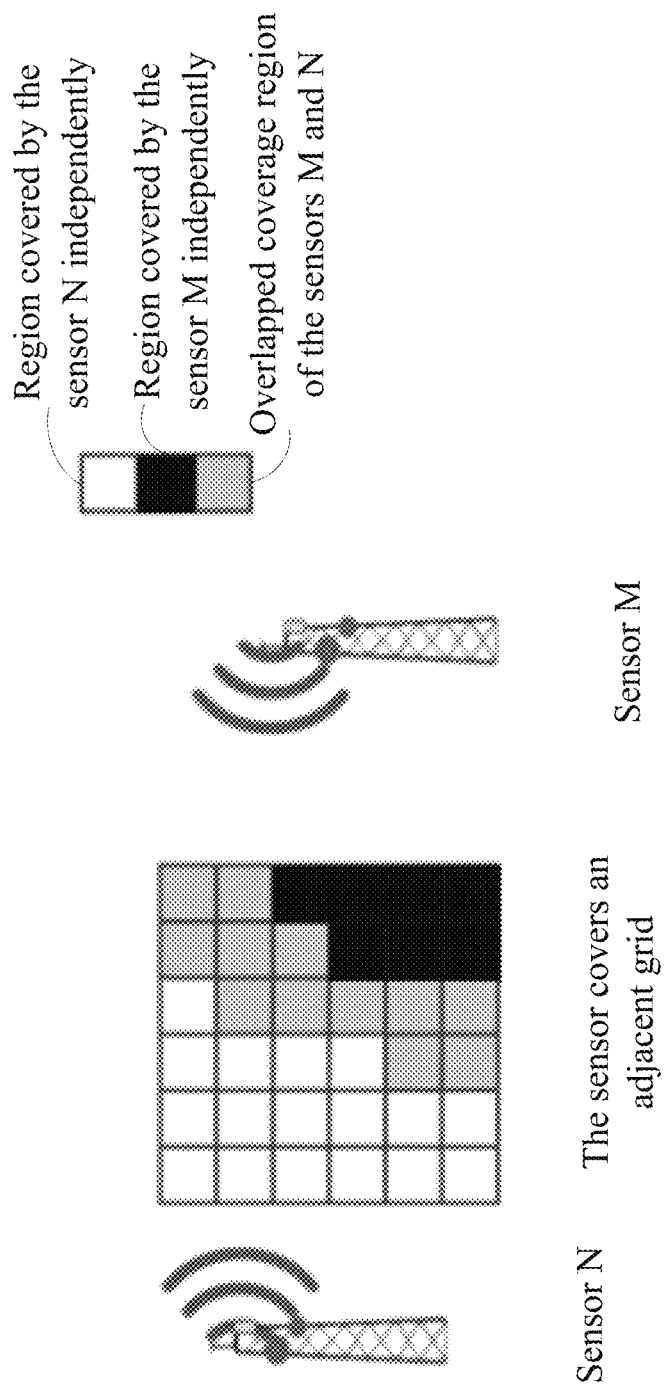
FIG. 16 is an exemplary schematic diagram of grid division according to an embodiment of this application.

After the topology relationship is established, the grid division is performed on the sensed regions of the multiple sensors. FIG. 16 is an exemplary schematic diagram of grid division. The grid division is performed on the sensed regions of the sensor N and the sensor M, which include a coverage region of only the sensor N, a coverage region of only the sensor M, and an overlapped coverage region of both the sensor M and the sensor N.

S406: Read converged information corresponding to each grid from the target converged information.

Because sensed target information at the overlapped region in the target converged information is converged, converged information corresponding to each grid in the shown target converged information can be read, to determine whether a grid is located in the overlapped region between the sensors.

S407: Update the grid division based on the converged information, and determine a second overlapped region in an updated grid.

Specifically, correlation of identification numbers of the targets in the grid can be accumulated for the converged information, thereby generating a more accurate and adaptive grid topology relationship. A hyperparameter related to correlated radii in the convergence algorithm is adaptively adjusted, and the grid can be updated gradually at preset time.

S408: Compare the first overlapped region with the second overlapped region, and detect an offset state of each of the multiple sensors.

The first overlapped region refers to an overlapped region between the sensors when the sensors are disposed. The second overlapped region refers to a current overlapped region between the sensors which is determined based on the converged information.

In some embodiments, the first overlapped region is compared with the second overlapped region, to determine whether there is offset of each sensor, so that when the sensed regions of the multiple sensors change due to factors such as working environment and device aging of the sensors, such change can be detected in a timely manner and the sensors can be adjusted manually or automatically, thereby ensuring the maximum seamless coverage of the sensed regions of the multiple sensors in the to-be-sensed region.

In this embodiment of this application, based on a sensing range and a position relationship of at least one sensor, a layered convergence topology structure is established, the sensed information sensed by each sensor is obtained separately, each piece of sensed information is subjected to layered convergence by using the layered convergence topology structure, and target converged information is generated. Herein, compared with the method of converging the sensed information all at once, when the layered convergence topology structure is used to converge the sensed information, a data volume of the sensed information during convergence communication can be reduced, thereby reducing the bandwidth need during the convergence communication. In addition, based on the sensing range and position relationship of the sensors, the layered convergence topology structure is established, so that a communication distance can be reduced, thereby improving communication efficiency and further reducing the bandwidth need during the convergence communication. Further, the layered convergence topology structure can be adjusted by reading the target converged information, to more accurately resolve the problem of the bandwidth need. In addition, the correlation re-identification is performed on the sensed target in the target converged information, so that global tracking of the sensed target can be implemented.

Figure 17:
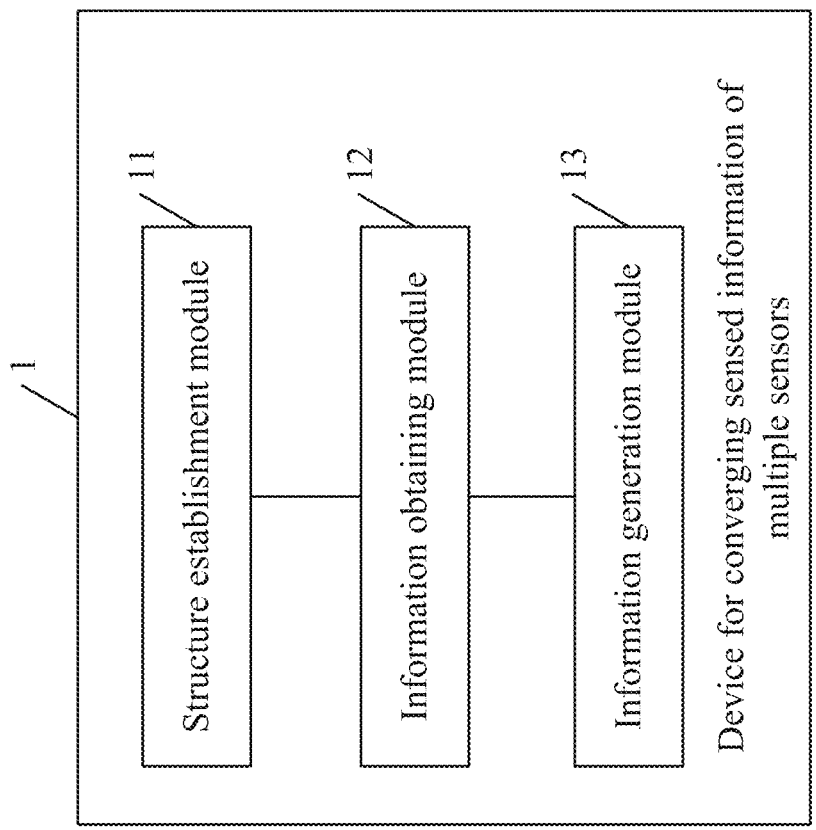
FIG. 17 is a schematic structural diagram of a device for converging sensed information of multiple sensors according to an embodiment of this application.

The device for converging sensed information of multiple sensors provided in this embodiment of this application is described in detail below with reference to FIG. 17. It should be noted that the device for converging sensed information of multiple sensors shown in FIG. 17 is configured to perform the method in the embodiments shown in FIG. 1 to FIG. 16 in this application. For ease of description, only some contents related to the embodiments of this application are shown. For undisclosed specific technical details, refer to the embodiments shown in FIG. 1 to FIG. 14 in this application.

Referring to FIG. 17, FIG. 17 is a schematic structural diagram of a device for converging sensed information of multiple sensors according to an embodiment of this application. The device 1 for converging sensed information of multiple sensors can be implemented as all or a part of the electronic device through software, hardware or a combination thereof. In some embodiments, a device 1 for converging sensed information of multiple sensors includes a structure establishment module 11, an information obtaining module 12, and an information generation module 13.

The structure establishment module 11 is configured to establish a layered convergence topology structure based on a sensing range and a position relationship of at least one sensor.

The information obtaining module 12 is configured to separately obtain sensed information sensed by each sensor.

The information generation module 13 is configured to subject each piece of sensed information to layered convergence by using the layered convergence topology structure, and generate target converged information.

Figure 18:
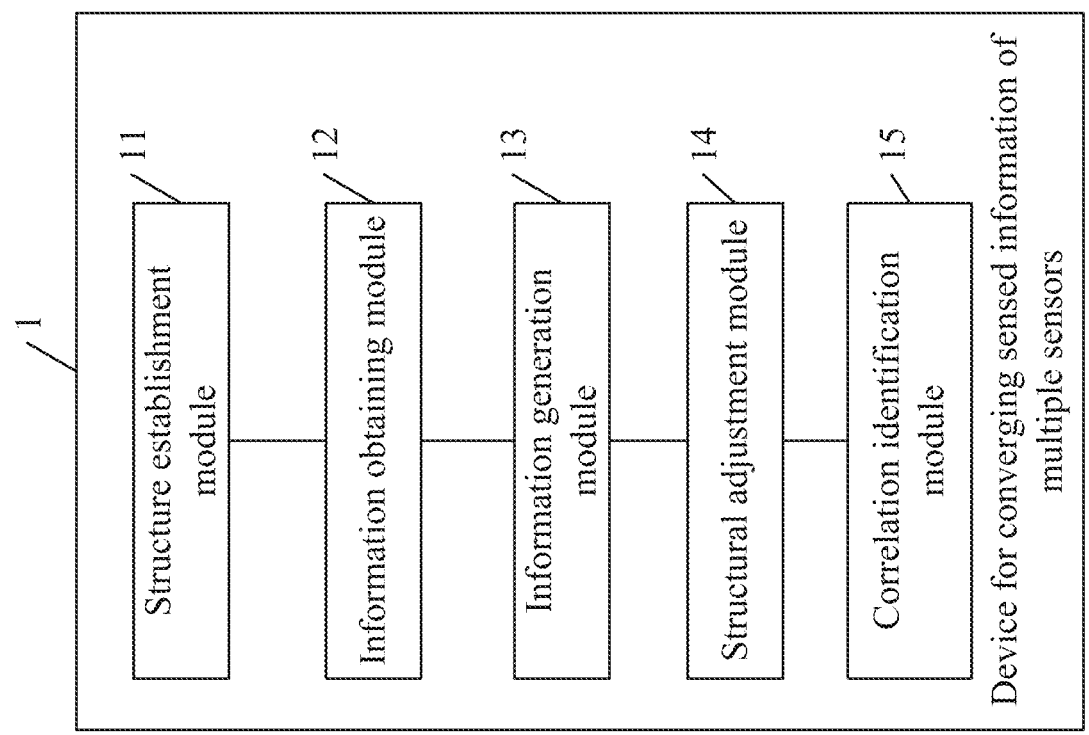
FIG. 18 is a schematic structural diagram of another device for converging sensed information of multiple sensors according to an embodiment of this application.

Optionally, as shown in FIG. 18, the device 1 further includes:
- a structural adjustment module 14, configured to adjust the layered convergence topology structure based on the target converged information.

Figure 19:
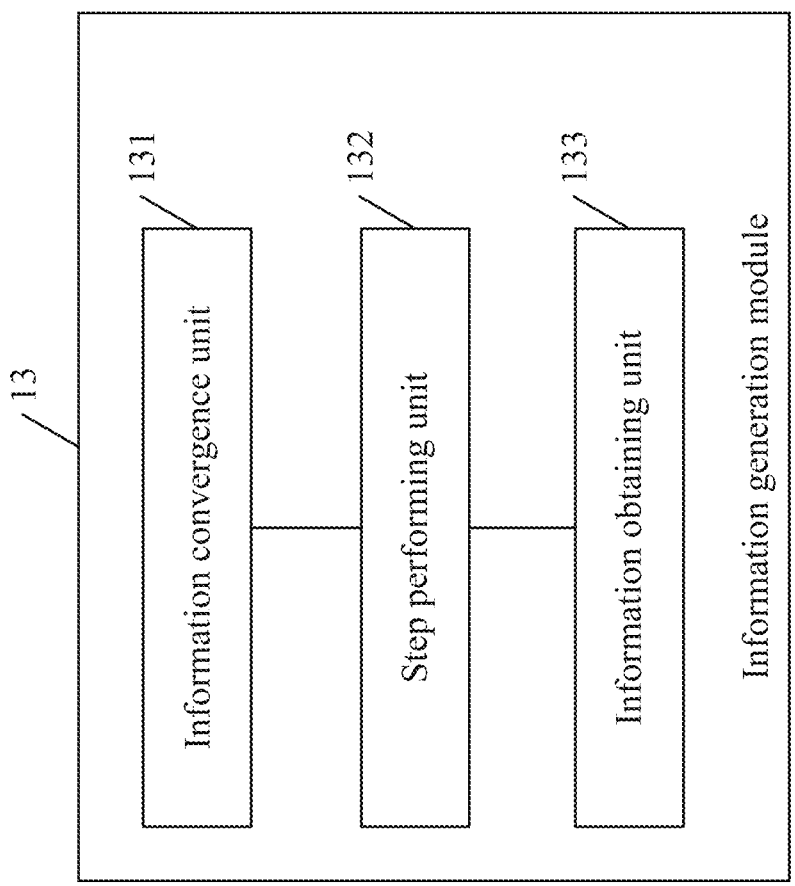
FIG. 19 is a schematic structural diagram of an information generation module according to an embodiment of this application.

Optionally, as shown in FIG. 19, the information generation module 13 includes:
- an information convergence unit 131, configured to divide multiple pieces of sensed information into multiple groups based on the layered convergence topology structure, where there are at least two groups; and converge the sensed information contained in each group to obtain at least two pieces of first converged information;
- a step performing unit 132, configured to use the at least two pieces of first converged information as the sensed information separately, and perform the step of dividing the multiple pieces of sensed information into the multiple groups and converging the sensed information contained in each group; and
- an information obtaining unit 133, configured to: when only one piece of first converged information is included, obtain the target converged information.

Figure 20:
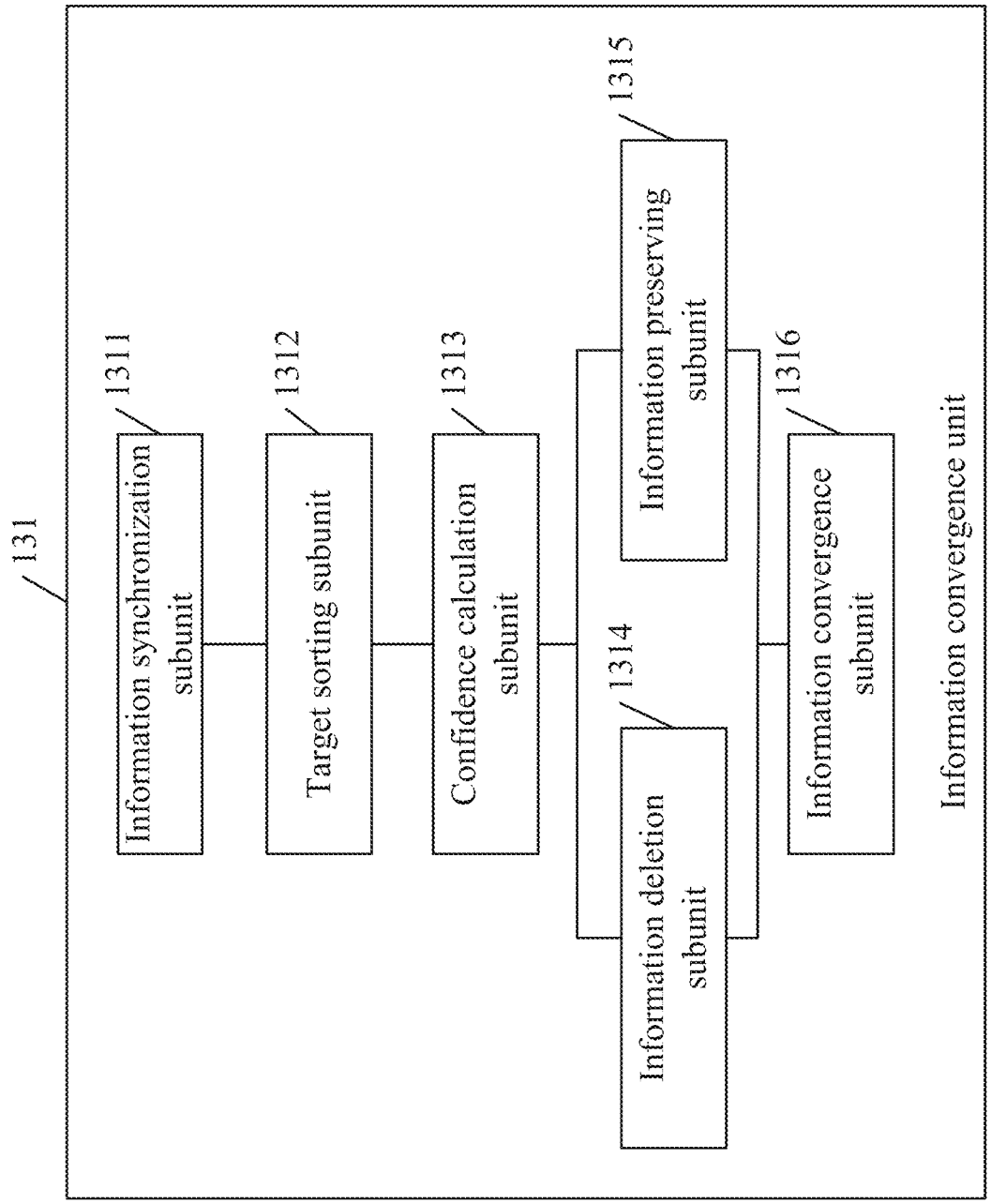
FIG. 20 is a schematic structural diagram of an information convergence unit according to an embodiment of this application.

Optionally, as shown in FIG. 20, the information convergence unit 131 includes:
- an information synchronization subunit 1311, configured to obtain a timestamp of each piece of sensed information in each group, and synchronize the sensed information based on timestamps to obtain synchronized sensed information;
- a target sorting subunit 1312, configured to sort sensed targets in accordance with a descending order of priorities based on the synchronized sensed information;
- a confidence calculation subunit 1313, configured to calculate convergence confidence between each two sensed targets sequentially in accordance with the descending order of priorities;
- an information deletion subunit 1314, configured to: when the convergence confidence is greater than a convergence confidence threshold, converge synchronized sensed information corresponding to the two sensed targets to obtain converged sensed information, use the converged sensed information as synchronized sensed information of a sensed target with a higher priority in the two sensed targets, and delete synchronized sensed information of a sensed target with a lower priority in the two sensed targets;
- an information preserving subunit 1315, configured to: when the convergence confidence is less than the convergence confidence threshold, preserve the synchronized sensed information of the two sensed targets; and an information convergence subunit 1316, configured to use the synchronized sensed information preserved in each group as the first converged information.

Optionally, the information synchronization subunit 1311 is specifically configured to:
calculate a synchronization timestamp corresponding to a target group in groups;
calculate a difference between the synchronization timestamp and each timestamp in the target group, and perform motion compensation on each piece of sensed information based on the difference to obtain synchronized sensed information of the target group;
obtain a next group in the groups, use the next group as the target group, and perform the step of calculating the synchronization timestamp corresponding to the target group in the groups; and
when there is no next group, generate synchronized sensed information corresponding to each group.

Optionally, the information synchronization subunit 1311 is specifically configured to:
determine a first target timestamp of first obtained sensed information in the group;
calculate a first difference between each timestamp and the target timestamp, and determine a second difference that is among the first differences and less than a time difference threshold;
store a first timestamp corresponding to each second difference into a first set;
calculate a first average of first timestamps, and use the first average as a second target timestamp;
calculate a third difference between a second timestamp other than the first timestamp in the timestamps and the second target timestamp, and determine each fourth difference that is among the third differences and less than the time difference threshold;
store each third timestamp corresponding to each fourth difference into a second set; and
calculate a timestamp average of each first timestamp in the first set and each third timestamp in the second set, and use the timestamp average as the synchronization timestamp.

Optionally, the target sorting subunit 1312 is specifically configured to:
obtain each piece of sensed sub-information from the synchronized sensed information;
perform a weighted sum operation on each piece of sensed sub-information and weight separately based on the preset weight corresponding to each piece of sensed sub-information, to obtain a priority of the synchronized sensed information; and
sort the sensed targets in accordance with the descending order of priorities.

Optionally, the confidence calculation subunit 1313 is specifically configured to:
obtain sensed information of each two sensed targets sequentially in accordance with the descending order of priorities;
calculate overlap and similarity between the two sensed targets based on the sensed information of the two sensed targets; and
perform a weighted operation based on the overlap and the similarity, to obtain the convergence confidence between the two sensed targets.

Optionally, the information deletion subunit 1314 is specifically configured to:
use size information of a sensed target with a high priority as size information in the converged sensed information; and
if continuous sensing time of the two sensed targets is greater than a time threshold, perform a weighted operation on position information of the two sensed targets based on weight of the continuous sensing time to obtain position information in the converged sensed information, and perform a weighted operation on motion information of the two sensed targets based on the weight of the continuous sensing time to obtain motion information in the converged sensed information; or
if the continuous sensing time of the two sensed targets is less than the time threshold, calculate an average of the position information and an average of the motion information of the two sensed targets, use the average of the position information as the position information in the converged sensed information, and use the average of the motion information as the motion information in the converged sensed information.

Optionally, the device 1 further includes:
a correlation identification module 15, configured to perform correlated re-identification on a sensed target in the target converged information.

Figure 21:
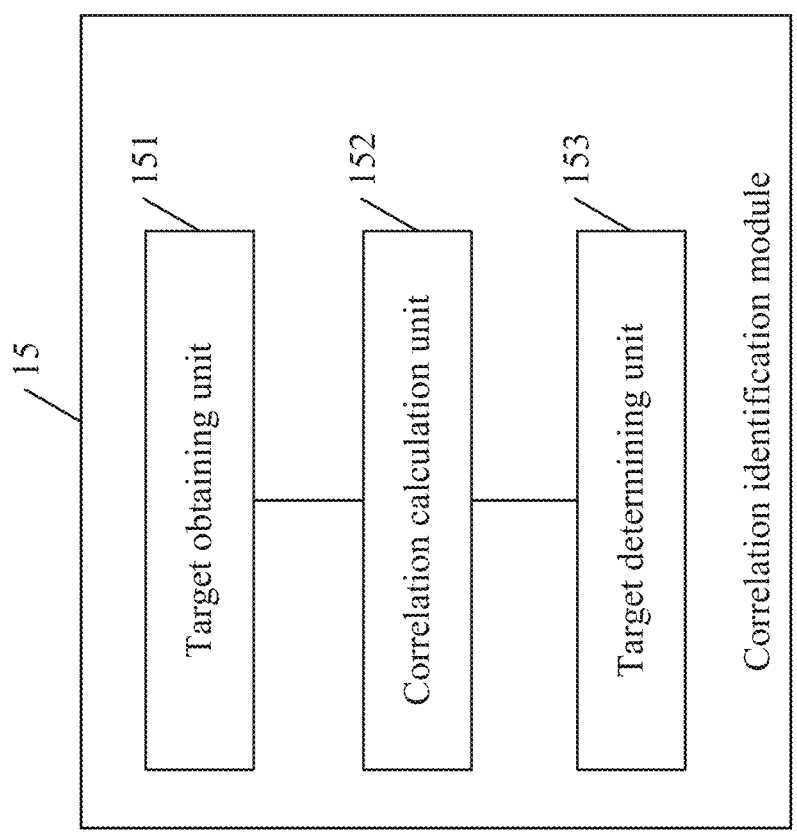
FIG. 21 is a schematic structural diagram of a correlation identification module according to an embodiment of this application.

Optionally, as shown in FIG. 21, the correlation identification module 15 includes:
a target obtaining unit 151, configured to obtain, from the target converged information, a sensed target located in a first overlapped region;
a correlation calculation unit 152, configured to calculate correlation of sensed targets located in the first overlapped region; and
a target determining unit 153, configured to: if correlation of the two sensed targets is greater than a correlation threshold, determine the two sensed targets as correlated sensed targets.

Figure 22:
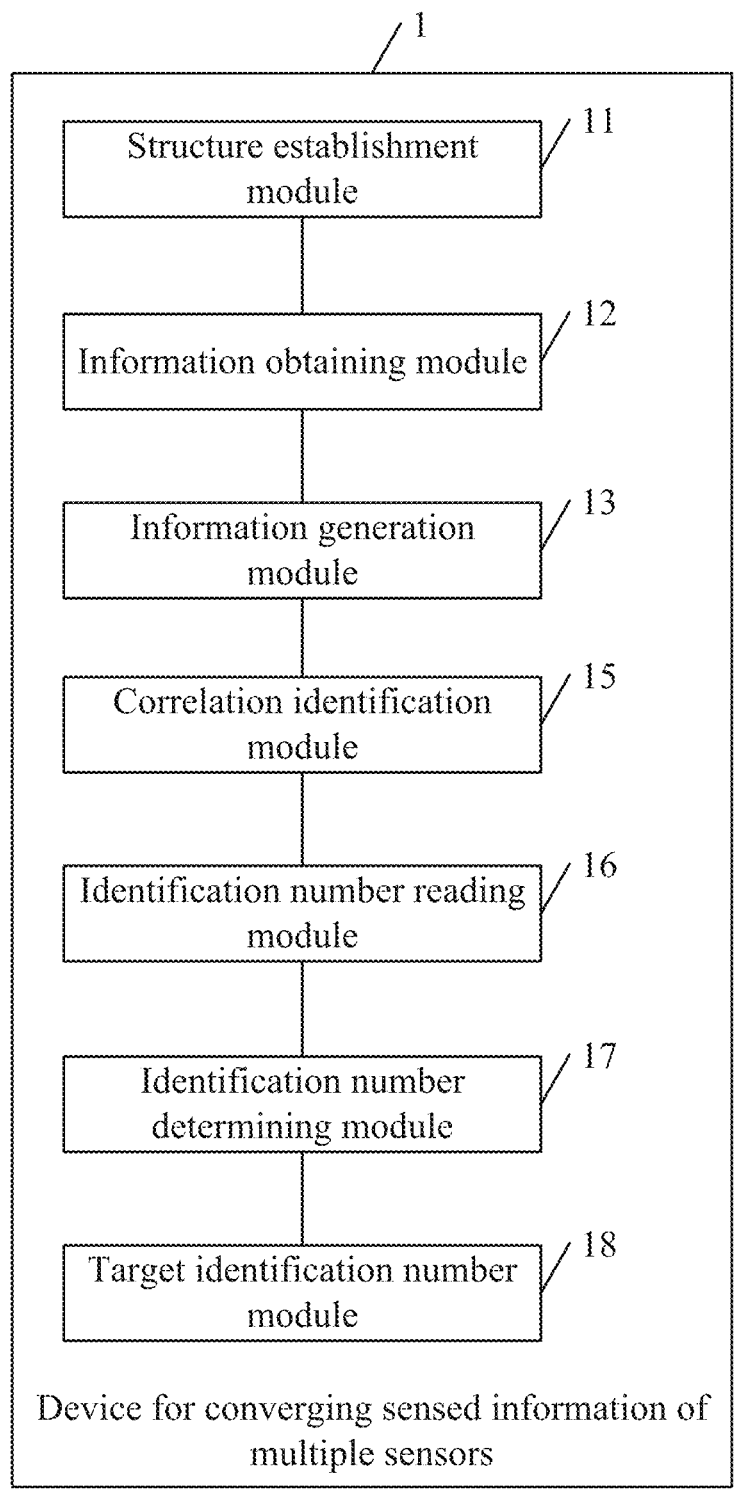
FIG. 22 is a schematic structural diagram of another device for converging sensed information of multiple sensors according to an embodiment of this application.

Optionally, as shown in FIG. 22, the device 1 further includes:
an identification number reading module 16, configured to: obtain sensed information of the correlated sensed targets, where the first overlapped region exists between sensed regions of adjacent sensors; and read an identification number of the sensed targets in the sensed information;
an identification number determining module 17, configured to: based on an order of sensing time of the sensed information, determine, from identification numbers, a target identification number of sensed information that is sensed first; and
a target identification number module 18, configured to use the target identification number as an identification number of the correlated sensed targets.

Figure 23:
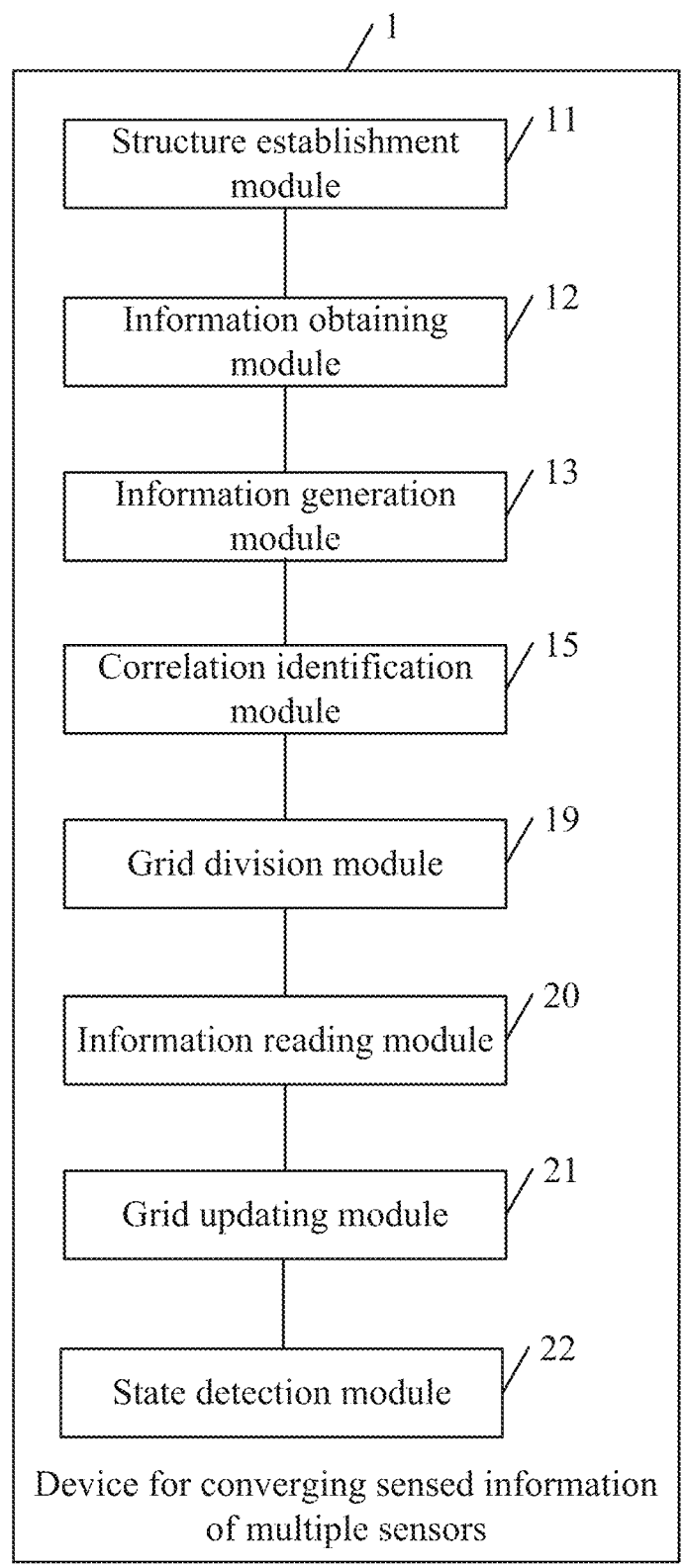
FIG. 23 is a schematic structural diagram of another device for converging sensed information of multiple sensors according to an embodiment of this application.

Optionally, as shown in FIG. 23, the device 1 further includes:
a grid division module 19, configured to perform grid division on sensed regions of multiple sensors, where the target converged information covers the sensed region;
an information reading module 20, configured to read converged information corresponding to each grid from the target converged information;
a grid updating module 21, configured to update the grid division based on the converged information, and determining a second overlapped region in an updated grid; and a state detection module 22, configured to compare the first overlapped region with the second overlapped region, and detect an offset state of each of the multiple sensors.

It should be noted that, when the device for converging sensed information of multiple sensors provided in the foregoing embodiments performs the method for converging sensed information of multiple sensors, division of the foregoing functional modules is used as an example for illustration. In actual application, the foregoing functions can be allocated to different functional modules for implementation based on a requirement, that is, an inner structure of the device is divided into different functional modules to implement all or some of the functions described above. In addition, embodiments of the device for converging sensed information of multiple sensors and the method for converging sensed information of multiple sensors provided above pertain to a same concept. For a specific implementation process, refer to the method embodiments. Details are not described herein again.

Serial numbers of the embodiments of this application are only intended for description, and do not indicate advantages or disadvantages of the embodiments.

In this embodiment of this application, based on a sensing range and a position relationship of at least one sensor, a layered convergence topology structure is established, the sensed information sensed by each sensor is obtained separately, each piece of sensed information is subjected to layered convergence by using the layered convergence topology structure, and target converged information is generated. Herein, compared with the method of converging the sensed information all at once, when the layered convergence topology structure is used to converge the sensed information, a data volume of the sensed information during convergence communication can be reduced, thereby reducing the bandwidth need during the convergence communication. In addition, based on the sensing range and position relationship of the sensors, the layered convergence topology structure is established, so that a communication distance can be reduced, thereby improving communication efficiency and further reducing the bandwidth need during the convergence communication.

An embodiment of this application further provides a computer storage medium. The computer storage medium may store a plurality of instructions. The instructions are capable of being loaded by a processor to perform the foregoing method for converging sensed information of multiple sensors in the embodiments shown in FIG. 1 to FIG. 16. For a specific execution process, refer to the specific description of the embodiments shown in FIG. 1 to FIG. 16. Details are not described herein again.

This application further provides a computer program product. The computer program product stores at least one instruction. The at least one instruction is capable of being loaded by a processor to perform the foregoing method for converging sensed information of multiple sensors in the embodiments shown in FIG. 1 to FIG. 16. For a specific execution process, refer to the specific description of the embodiments shown in FIG. 1 to FIG. 16. Details are not described herein again.

Figure 24:
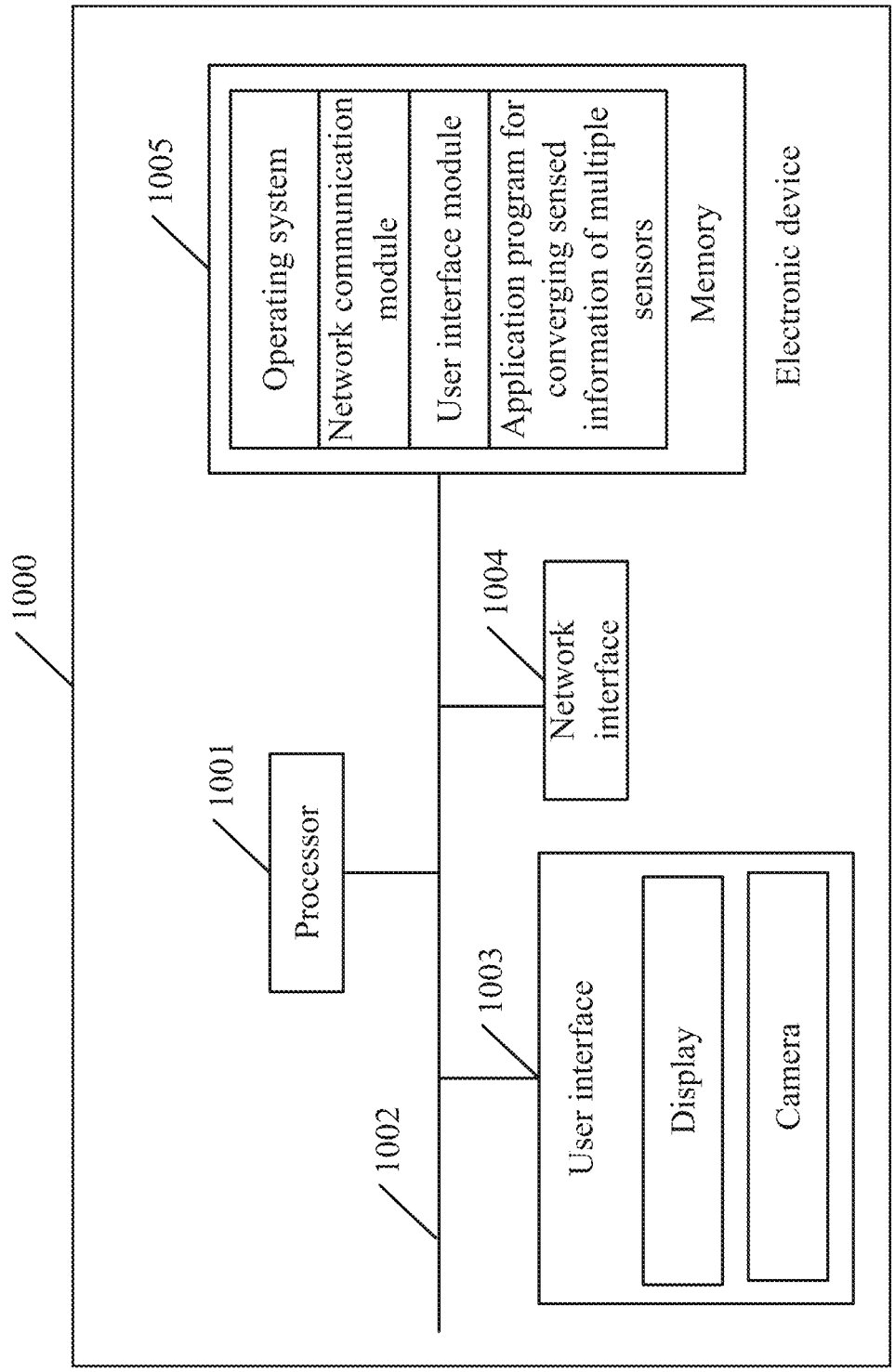
FIG. 24 is a schematic structural diagram of an electronic device according to an embodiment of this application.

FIG. 24 is a schematic structural diagram of an electronic device according to an embodiment of this application. As shown in FIG. 24, the electronic device 1000 may include: at least one processor 1001, at least one network interface 1004, a user interface 1003, a memory 1005, and at least one communication bus 1002.

Herein, the communication bus 1002 is configured to implement a connection and communication among these components.

Herein, the user interface 1003 may include a display (Display) and a camera (Camera), or optionally, the user interface 1003 may further include a standard wired interface and a wireless interface.

Herein, the network interface 1004 may optionally include a standard wired interface and a wireless interface (such as, a Wi-Fi interface).

Herein, the processor 1001 may include one or more processing cores. The processor 1001 uses various interfaces and lines to connect various parts of the entire server 1000, and executes various functions and processes data of the server 1000 by running or executing instructions, programs, code sets, or instruction sets stored in the memory 1005, and invoking data stored in the memory 1005. Optionally, the processor 1001 may be realized in at least one hardware form of digital signal processing (DSP), a field-programmable gate array (FPGA), and a programmable logic array (PLA). The processor 1001 may integrate a combination of one or more of a central processing unit (CPU), a graphics processing unit (GPU), a modem, and the like. The CPU is mainly configured to process the operating system, user interface, and applications program, and the like. The GPU is configured to render and draw content that needs to be displayed on a display. The modem is configured to process wireless communication. It may be understood that the forgoing modem may not be integrated into the processor 1001, and may be implemented by one chip independently.

The memory 1005 may include a random access memory (RAM), or a read-only memory (ROM). Optionally, the memory 1005 includes a non-transitory computer-readable medium. The memory 1005 may be configured to store the instructions, the programs, the codes, the code sets, or the instruction sets. The memory 1005 may include a program storage region and a data storage region. The program storage region may store instructions for implementing the operating system, instructions for at least one function (such as a touch control function, a sound play function, and an image play function), and instructions for implementing each of the foregoing method embodiments. Optionally, the memory 1005 may also be at least one storage device distant from the forgoing processor 1001. As shown in FIG. 24, as a computer storage medium, the memory 1005 may include an operating system, a network communication module, a user interface module, and an application program for converging sensed information of multiple sensors.

In the electronic device 1000 shown in FIG. 24, the user interface 1003 is mainly configured to provide an input interface for a user to obtain data input by the user; and the processor 1001 can be used to invoke an application program for converging sensed information of multiple sensors stored in the memory 1005, and specifically perform the following operations:

establishing a layered convergence topology structure based on a sensing range and a position relationship of at least one sensor;

separately obtaining sensed information sensed by each sensor; and subjecting each piece of sensed information to layered convergence by using the layered convergence topology structure and generating target converged information.

In an embodiment, after subjecting each piece of sensed information to layered convergence by using the layered convergence topology structure and generating target converged information, the processor 1001 further performs the following operations:

adjusting the layered convergence topology structure based on the target converged information.

In an embodiment, when subjecting each piece of sensed information to layered convergence by using the layered convergence topology structure and generating target converged information, the processor 1001 specifically performs the following operations:

dividing multiple pieces of sensed information into multiple groups based on the layered convergence topology structure, where there are at least two groups; and converging the sensed information contained in each group to obtain at least two pieces of first converged information;

using the at least two pieces of first converged information as the sensed information separately, and performing the step of dividing the multiple pieces of sensed information into the multiple groups and converging the sensed information contained in each group; and when only one piece of first converged information is included, obtaining the target converged information.

In an embodiment, when converging the sensed information contained in each group to obtain at least two pieces of first converged information, the processor 1001 specifically performs the following operations:

obtaining a timestamp of each piece of sensed information in each group, and synchronizing the sensed information based on timestamps to obtain synchronized sensed information;

sorting sensed targets in accordance with a descending order of priorities based on the synchronized sensed information;

calculating convergence confidence between each two sensed targets sequentially in accordance with the descending order of priorities;

when the convergence confidence is greater than a convergence confidence threshold, converging synchronized sensed information corresponding to the two sensed targets to obtain converged sensed information, using the converged sensed information as synchronized sensed information of a sensed target with a higher priority in the two sensed targets, and deleting synchronized sensed information of a sensed target with a lower priority in the two sensed targets;

when the convergence confidence is less than the convergence confidence threshold, preserving the synchronized sensed information of the two sensed targets; and using the synchronized sensed information preserved in each group as the first converged information.

In an embodiment, when synchronizing the sensed information based on timestamps to obtain synchronized sensed information, the processor 1001 specifically performs the following operations:

calculating a synchronization timestamp corresponding to a target group in groups;

calculating a difference between the synchronization timestamp and each timestamp in the target group, and performing motion compensation on each piece of sensed information based on the difference to obtain synchronized sensed information of the target group;

obtaining a next group in the groups, using the next group as the target group, and performing the step of calculating the synchronization timestamp corresponding to the target group in the groups; and when there is no next group, generating synchronized sensed information corresponding to each group.

In an embodiment, when calculating a synchronization timestamp corresponding to a target group in groups, the processor 1001 specifically performs the following operations:

determining a first target timestamp of first obtained sensed information in the group;

calculating a first difference between each timestamp and the target timestamp, and determining a second difference that is among the first differences and less than a time difference threshold;

storing a first timestamp corresponding to each second difference into a first set;

calculating a first average of first timestamps, and using the first average as a second target timestamp;

calculating a third difference between a second timestamp other than the first timestamp in the timestamps and the second target timestamp, and determining each fourth difference that is among the third differences and less than the time difference threshold;

storing each third timestamp corresponding to each fourth difference into a second set; and calculating a timestamp average of each first timestamp in the first set and each third timestamp in the second set, and using the timestamp average as the synchronization timestamp.

In an embodiment, when sorting sensed targets in accordance with a descending order of priorities based on the synchronized sensed information, the processor 1001 specifically performs the following operations:

obtaining each piece of sensed sub-information from the synchronized sensed information;

performing a weighted sum operation on each piece of sensed sub-information and weight separately based on the preset weight corresponding to each piece of sensed sub-information, to obtain a priority of the synchronized sensed information; and sorting the sensed targets in accordance with the descending order of priorities.

In an embodiment, when calculating convergence confidence between each two sensed targets sequentially in accordance with the descending order of priorities, the processor 1001 specifically performs the following operations:

obtaining sensed information of each two sensed targets sequentially in accordance with the descending order of priorities;

calculating overlap and similarity between the two sensed targets based on the sensed information of the two sensed targets; and performing a weighted operation based on the overlap and the similarity, to obtain the convergence confidence between the two sensed targets.

In an embodiment, if the sensed information includes size information, position information, and motion information, when converging synchronized sensed information corresponding to the two sensed targets to obtain converged sensed information, the processor 1001 specifically performs the following operations:

using size information of a sensed target with a high priority as size information in the converged sensed information; and if continuous sensing time of the two sensed targets is greater than a time threshold, performing a weighted operation on position information of the two sensed targets based on weight of the continuous sensing time to obtain position information in the converged sensed information, and performing a weighted operation on motion information of the two sensed targets based on the weight of the continuous sensing time to obtain motion information in the converged sensed information; or if the continuous sensing time of the two sensed targets is less than the time threshold, calculating an average of the position information and an average of the motion information of the two sensed targets, using the average of the position information as the position information in the converged sensed information, and using the average of the motion information as the motion information in the converged sensed information.

In an embodiment, after subjecting each piece of sensed information to layered convergence by using the layered convergence topology structure and generating target converged information, the processor 1001 further performs the following operations:

performing correlated re-identification on a sensed target in the target converged information.

In an embodiment, when performing correlated re-identification on a sensed target in the target converged information, the processor 1001 specifically performs the following operations:

obtaining, from the target converged information, a sensed target located in a first overlapped region, where the first overlapped region exists between sensed regions of adjacent sensors;

calculating correlation of sensed targets located in the first overlapped region; and if correlation of the two sensed targets is greater than a correlation threshold, determining the two sensed targets as correlated sensed targets.

In an embodiment, after determining the correlated sensed targets in the first overlapped region, the processor 1001 further performs the following operations:

obtaining sensed information of the correlated sensed targets, and reading an identification number of the sensed targets in the sensed information;

based on an order of sensing time of the sensed information, determining, from identification numbers, a target identification number of sensed information that is sensed first;

using the target identification number as an identification number of the correlated sensed targets.

In an embodiment, when executing an application program for converging sensed information of multiple sensors, the processor 1001 further performs the following operations:

performing grid division on sensed regions of multiple sensors, where the target converged information covers the sensed region;

reading converged information corresponding to each grid from the target converged information;

updating the grid division based on the converged information, and determining a second overlapped region in an updated grid; and comparing the first overlapped region with the second overlapped region, and detecting an offset state of each of the multiple sensors.

In this embodiment of this application, based on a sensing range and a position relationship of at least one sensor, a layered convergence topology structure is established, the sensed information sensed by each sensor is obtained separately, each piece of sensed information is subjected to layered convergence by using the layered convergence topology structure, and target converged information is generated. Herein, compared with the method of converging the sensed information all at once, when the layered convergence topology structure is used to converge the sensed information, a data volume of the sensed information during convergence communication can be reduced, thereby reducing the bandwidth need during the convergence communication. In addition, based on the sensing range and position relationship of the sensors, the layered convergence topology structure is established, so that a communication distance can be reduced, thereby improving communication efficiency and further reducing the bandwidth need during the convergence communication.

The person skilled in the art can understand that all or part of procedures in methods of the forgoing embodiments can be implemented by instructing relevant hardware via computer program. The program can be stored in a computer readable storage medium. During execution, the computer program can include the procedures of the embodiments of the forgoing methods. A storage medium can be a magnetic disk, an optical disc, the read-only storage memory or the random storage memory, and so on.

The forgoing disclosed are only preferred embodiments of the present application, which of course cannot be used to limit the scope of rights of the present application. Therefore, equivalent changes made in accordance with the claims of the present application still fall within the scope of the application.

What is claimed is:

1. A method for converging sensed information of a plurality of sensors, comprising:

establishing a layered convergence topology structure for the plurality of sensors based on a sensing range and a position relationship of at least one sensor from the sensors;

dividing a plurality of pieces of first sensed information, respectively captured through each sensor of the sensors, into at least two first groups based on the layered convergence topology structure;

converging each piece of first sensed information in respective first group of the at least two first groups to obtain at least two pieces of first converged information;

determining the at least two pieces of first converged information as at least two pieces of second sensed information for convergence to obtain second converged information;

when a piece number of the second converged information is one, determining the second converged information as target converged information;

dividing the at least two pieces of second sensed information into at least two second groups based on the layered convergence topology structure; and converging each piece of second sensed information in respective second group of the at least two second groups to obtain the second converged information.

2. The method of claim 1, further comprising:

after obtaining the target converged information, adjusting the layered convergence topology structure based on the target converged information.

3. The method of claim 2, wherein adjusting the layered convergence topology structure comprises at least one of:

adding a convergence unit to a first convergence layer of the layered convergence topology structure; or adding a second convergence layer to the layered convergence topology structure.

4. The method of claim 2, wherein adjusting the layered convergence topology structure comprises regrouping the plurality of sensors based on, at least in part, a data volume of the first sensed information respectively captured through each of the sensors.

5. The method of claim 1, wherein converging each piece of first sensed information in respective first group of the at least two first groups to obtain the at least two pieces of first converged information comprises:
obtaining a timestamp of each piece of first sensed information in respective first group of the at least two first groups; and
performing motion compensation on each piece of first sensed information based on a corresponding timestamp to determine synchronized first sensed information corresponding to respective first group of the at least two first groups.

6. The method of claim 5, further comprising:
calculating a synchronization timestamp corresponding to a first group of the at least two first groups; and
calculating a difference between the synchronization timestamp and each timestamp of respective piece of first sensed information in the first group, and performing the motion compensation on each piece of first sensed information in the first group based on the difference to obtain the synchronized first sensed information corresponding to the first group.

7. The method of claim 6, wherein calculating the synchronization timestamp corresponding to the first group comprises:
obtaining an earliest timestamp of the first sensed information in the first group as a first target timestamp;
obtaining a first difference between the first target timestamp and each timestamp of respective piece of first sensed information in the first group, and determining whether the first difference is a second difference that is less than a time difference threshold, each of the second differences corresponding to a first-set timestamp;
obtaining a second target timestamp based on an average of the first-set timestamps;
calculating a third difference between the second target timestamp and each timestamp of respective piece of first sensed information in the first group, other than the first-set timestamps, and determining whether the third difference is a fourth difference that is less than the time difference threshold, each of the fourth differences corresponding to a second-set timestamp; and
determining a timestamp average of the first-set timestamps and the second timestamps as the synchronization timestamp.

8. The method of claim 5, further comprising:
calculating convergence confidence between each two sensed targets based on the synchronized first sensed information,
wherein converging each piece of first sensed information in respective first group of the at least two first groups to obtain the at least two pieces of first converged information comprises:
obtaining the at least two pieces of first converged information based on the synchronized first sensed information and the convergence confidence.

9. The method of claim 1, further comprising after obtaining the target converged information:
performing correlated re-identification on sensed targets in the target converged information; and
determining correlated sensed targets from the sensed targets based on the correlated re-identification.

10. The method of claim 9, wherein performing the correlated re-identification on the sensed targets in the target converged information comprises:
obtaining, from the target converged information, sensed targets located in a first overlapped region located between sensed regions of adjacent sensors of the sensors;
calculating correlation of the sensed targets in the first overlapped region; and
when correlation of two of the sensed targets is greater than a correlation threshold, determining the two sensed targets as the correlated sensed targets.

11. The method of claim 10, further comprising:
obtaining third sensed information of each of the correlated sensed targets, and acquiring an identification number of each correlated sensed target in respective third sensed information;
determining, from the identification numbers, a target identification number of the third sensed information that was captured earliest; and
determining the target identification number as an identification number for the correlated sensed targets.

12. The method of claim 10, further comprising:
performing grid division on the sensed regions covered by the target converged information, each grid of the target converged information comprising grid converged information;
updating the grid division based on the grid converged information to determine a second overlapped region; and
determine an offset state corresponding to the two sensed targets based on the first overlapped region and the second overlapped region.

13. An electronic device, comprising:
a processor; and
a storage medium coupled to the processor and storing instructions that, when executed by the processor, cause the processor to:
establish a layered convergence topology structure for a plurality of sensors based on a sensing range and a position relationship of at least one sensor from the sensors;
divide a plurality of pieces of first sensed information, respectively captured through each sensor of the sensors, into at least two first groups based on the layered convergence topology structure;
converge each piece of first sensed information in respective first group of the at least two first groups to obtain at least two pieces of first converged information;
determine the at least two pieces of first converged information as at least two pieces of second sensed information for convergence to determine second converged information;
when a piece number of the second converged information is one, determine the second converged information as target converged information;
divide the at least two pieces of second sensed information into at least two second groups based on the layered convergence topology structure; and
converge each piece of second sensed information in respective second group of the at least two second groups to obtain the second converged information.

14. The electronic device of claim 13, wherein the executed instructions further cause the processor to:
   after obtaining the target converged information, adjust the layered convergence topology structure based on the target converged information.

15. The electronic device of claim 13, wherein the executed instructions further cause the processor to:
   add a convergence unit to a first convergence layer of the layered convergence topology structure; and
   add a second convergence layer to the layered convergence topology structure.

16. The electronic device of claim 13, wherein the executed instructions further cause the processor to:
   obtain a timestamp of each piece of first sensed information in respective first group of the at least two first groups; and
   perform motion compensation on each piece of first sensed information based on a corresponding timestamp to determine synchronized first sensed information corresponding to respective first group of the at least two first groups.

17. The electronic device of claim 13, wherein the executed instructions further cause the processor to:
   perform correlated re-identification on sensed targets in the target converged information; and
   determine correlated sensed targets from the sensed targets based on the correlated re-identification.

18. A non-transitory computer storage medium storing computer-executable instructions for execution by a hardware processor to:
   establish a layered convergence topology structure for a plurality of sensors based on a sensing range and a position relationship of at least one sensor from the sensors;
   divide a plurality of pieces of first sensed information, respectively captured through each sensor of the sensors, into at least two first groups based on the layered convergence topology structure;
   converge each piece of first sensed information in respective first group of the at least two first groups to obtain at least two pieces of first converged information;
   determine the at least two pieces of first converged information as at least two pieces of second sensed information for convergence to determine second converged information;
   when a piece number of the second converged information is one, determine the second converged information as target converged information;
   divide the at least two pieces of second sensed information into at least two second groups based on the layered convergence topology structure; and
   converge each piece of second sensed information in respective second group of the at least two second groups to obtain the second converged information.

* * * * *